US012742110B2

(12) United States Patent
Hitomi et al.

(10) Patent No.: US 12,742,110 B2
(45) Date of Patent: Sep. 22, 2026

(54) COMPOSITION, THERMALLY CONDUCTIVE MATERIAL, THERMALLY CONDUCTIVE SHEET, AND DEVICE WITH THERMALLY CONDUCTIVE LAYER

(71) Applicant: FUJIFILM Corporation, Tokyo (JP)

(72) Inventors: Seiichi Hitomi, Ashigarakami-gun (JP); Daisuke Hayashi, Ashigarakami-gun (JP); Teruki Niori, Ashigarakami-gun (JP); Keita Takahashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1064 days.

(21) Appl. No.: 17/879,985

(22) Filed: Aug. 3, 2022

(65) Prior Publication Data

US 2023/0020941 A1 Jan. 19, 2023

Related U.S. Application Data

(63) Continuation of application No. PCT/JP2020/048443, filed on Dec. 24, 2020.

(30) Foreign Application Priority Data

Feb. 6, 2020 (JP) ................................ 2020-018779

(51) Int. Cl.
*C09K 5/14* (2006.01)

(52) U.S. Cl.
CPC .................................... *C09K 5/14* (2013.01)

(58) Field of Classification Search
CPC ............. C09K 5/14; C08K 2003/2227; C08K 2003/385; C08K 2201/001
See application file for complete search history.

(56) References Cited

U.S. PATENT DOCUMENTS

| | | | | |
|---|---|---|---|---|
| 6,630,745 | B1 * | 10/2003 | Osada | C08L 63/00 525/481 |
| 2011/0139496 | A1 * | 6/2011 | Nakamura | C08G 59/4276 525/394 |
| 2014/0077129 | A1 | 3/2014 | Moon et al. | |
| 2017/0290149 | A1 * | 10/2017 | Nakamura | C08G 59/621 |
| 2018/0163015 | A1 | 6/2018 | Takezawa et al. | |
| 2018/0186925 | A1 * | 7/2018 | Sumita | H01L 23/295 |
| 2018/0208820 | A1 * | 7/2018 | Tsuda | H01L 23/3733 |
| 2020/0377647 | A1 | 12/2020 | Enomoto et al. | |
| 2021/0355364 | A1 | 11/2021 | Hayashi et al. | |

FOREIGN PATENT DOCUMENTS

| | | | | |
|---|---|---|---|---|
| CN | 105308121 | A | 2/2016 | |
| JP | 5-125159 | A | 5/1993 | |
| JP | 9-100394 | A | 4/1997 | |
| JP | 2001-214039 | A | 8/2001 | |
| JP | 2013036041 | A * | 2/2013 | C09D 163/00 |
| JP | 2013-234313 | A | 11/2013 | |
| JP | 2014-196403 | A | 10/2014 | |
| JP | 2018- 044072 | A | 3/2018 | |
| JP | 2019-196433 | A | 11/2019 | |
| TW | 201922911 | A | 6/2019 | |
| WO | 2014/208352 | A1 | 12/2014 | |
| WO | 2016/190260 | A1 | 12/2016 | |
| WO | 2018/180470 | A1 | 10/2018 | |
| WO | 2020158259 | A1 | 8/2020 | |

OTHER PUBLICATIONS

Clarivate Analytics machine translation of JP 2014196403 A to Nakamura et al. published Oct. 16, 2014 (Year: 2014).*
Clarivate Analytics machine translation for JP 2013036041 A to Morita et al. published Feb. 21, 2013 (Year: 2013).*
Extended European Search Report dated Dec. 7, 2022 from the European Patent Office in EP Application No. 20917737.7.
Office Action issued May 20, 2024 in Taiwanese Application No. 110101358.
Office Action issued Jun. 28, 2024 in Chinese Application No. 202080095499.2.
International Search Report dated Mar. 16, 2021 in International Application No. PCT/JP2020/048443.

(Continued)

*Primary Examiner* — Jane L Stanley

(74) *Attorney, Agent, or Firm* — Sughrue Mion, PLLC

(57) ABSTRACT

A composition capable of forming a thermally conductive material having excellent thermally conductive properties and excellent handleability in a semi-cured state is provided. A thermally conductive material, a thermally conductive sheet, and a device with a thermally conductive layer are also provided. The composition contains a phenolic compound, an epoxy compound, a compound represented by Formula (1), and an inorganic nitride:

(1)

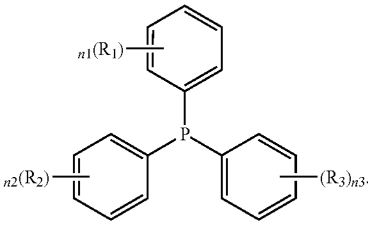

19 Claims, No Drawings

(56) References Cited

OTHER PUBLICATIONS

Written Opinion of the International Searching Authority dated Mar. 16, 2021 in International Application No. PCT/JP2020/048443.

International Preliminary Report on Patentability dated Jul. 28, 2022 with a Translation of the Written Opinion of the International Searching Authority in International Application No. PCT/JP2020/048443.

Communication dated Sep. 15, 2024, issued in Chinese Application No. 202080095499.2.

Office Action issued Mar. 28, 2023 in Japanese Application No. 2021-575658.

Communication dated Sep. 28, 2023 issued by the State Intellectual Property Office of the P.R.China in application No. 202080095499.2.

* cited by examiner

COMPOSITION, THERMALLY CONDUCTIVE MATERIAL, THERMALLY CONDUCTIVE SHEET, AND DEVICE WITH THERMALLY CONDUCTIVE LAYER

CROSS-REFERENCE TO RELATED APPLICATIONS

This application is a Continuation of PCT International Application No. PCT/JP2020/048443 filed on Dec. 24, 2020, which claims priority under 35 U.S.C. § 119(a) to Japanese Patent Application No. 2020-018779 filed on Feb. 6, 2020. The above application is hereby expressly incorporated by reference, in its entirety, into the present application.

BACKGROUND OF THE INVENTION

1. Field of the Invention

The present invention relates to a composition, a thermally conductive material, a thermally conductive sheet, and a device with a thermally conductive layer.

2. Description of the Related Art

In recent years, a power semiconductor device used in various electrical machines such as a personal computer, a general household electric appliance, and an automobile has been rapidly miniaturized. With the miniaturization, it is difficult to control heat generated from the power semiconductor device having a high density.

In order to deal with such a problem, a thermally conductive material, which promotes heat dissipation from the power semiconductor device, is used.

For example, WO2016/190260A discloses an invention (refer to Claims 1, 13, and 18) related to an epoxy resin composition containing hexagonal boron nitride particles having an aspect ratio of 2 or more, a liquid crystalline epoxy monomer, and a curing agent, and capable of forming a resin matrix having a domain of a smectic structure by reacting the liquid crystal epoxy monomer with the curing agent, a B-stage sheet which is a semi-cured product of an epoxy resin composition thereof, a heat dissipation material which is a cured product of an epoxy resin composition thereof.

SUMMARY OF THE INVENTION

As a result of examining the composition for forming a thermally conductive material containing an inorganic nitride referring to the disclosure of WO2016/190260A, the present inventors found that there is room for further improvement in handleability in a semi-cured state in the composition for forming a thermally conductive material in which a curing accelerator is used for the purpose of improving thermally conductive properties of the thermally conductive material containing an inorganic nitride.

Therefore, an object of the present invention is to provide a composition capable of forming a thermally conductive material having excellent thermally conductive properties and excellent handleability in a semi-cured state.

In addition, another object of the present invention is to provide a thermally conductive material, a thermally conductive sheet, and a device with a thermally conductive layer, formed of the composition.

As a result of a thorough examination to achieve the objects, the present inventors found that the objects can be achieved by the following configuration.

[1]

A composition containing a phenolic compound, an epoxy compound, a compound represented by Formula (1), and an inorganic nitride.

[2]

The composition as described in [1], in which at least one of substituents represented by $R_1$ to $R_3$ is substituted at an ortho-position with respect to a bonding position of a phosphorus atom in a benzene ring in Formula (1).

[3]

The composition as described in [1] or [2], in which the substituents represented by $R_1$ to $R_3$ are alkyl groups having no substituent or alkoxy groups having no substituent.

[4]

The composition as described in any one of [1] to [3], in which n1 to n3 each independently represent 1 or 2 in Formula (1).

[5]

The composition as described in any one of [1] to [4], in which the phenolic compound has a molecular weight of 1,000 or less.

[6]

The composition as described in any one of [1] to [5], in which the phenolic compound includes a phenolic compound having a triazine ring.

[7]

The composition as described in any one of [1] to [6], in which the inorganic nitride includes aggregated inorganic nitride particles having an average particle diameter of 20 m or greater.

[8]

The composition as described in any one of [1] to [7], in which the inorganic nitride includes a boron nitride.

[9]

A thermally conductive material formed by curing the composition as described in any one of [1] to [8].

[10]

A thermally conductive sheet consisting of the thermally conductive material as described in [9].

[11]

A device with a thermally conductive layer including a device and a thermally conductive layer containing the thermally conductive sheet as described in [10], disposed on the device.

According to the present invention, it is possible to provide a composition capable of forming a thermally conductive material having excellent thermally conductive properties and excellent handleability in a semi-cured state.

In addition, according to the present invention, it is possible to provide a thermally conductive material formed of the composition, a thermally conductive sheet, and a device with a thermally conductive layer.

DESCRIPTION OF THE PREFERRED EMBODIMENTS

Hereinafter, a composition, a thermally conductive material, a thermally conductive sheet, and a device with a thermally conductive layer according to an embodiment of the present invention will be described in detail.

The following constituent elements are described based on the representative embodiments of the present invention in some cases, but the present invention is not limited to such an embodiment.

In the present specification, the numerical range expressed using "to" means a range including the numerical values listed before and after "to" as a lower limit value and an upper limit value.

In the present specification, in a case where two or more kinds of a certain component are present, the "content" of the component means a total content of the two or more kinds of components.

In addition, in the present specification, an epoxy group is a functional group also called an oxiranyl group, and for example, a group in which two adjacent carbon atoms of a saturated hydrocarbon ring group are bonded by an oxo group (—O—) to form an oxirane ring and the like are also included in the epoxy group. The epoxy group may or may not have a substituent (a methyl group and the like), if possible.

In the present specification, the description of "(meth) acryloyl group" means "either or both of an acryloyl group and a methacryloyl group". Moreover, the description of "(meth)acrylamide group" means "either or both of an acrylamide group and a methacrylamide group".

In the present specification, an acid anhydride group may be a monovalent group or a divalent group, unless otherwise specified. In a case where the acid anhydride group represents a monovalent group, examples of the monovalent group include a substituent obtained by removing any hydrogen atom from an acid anhydride such as maleicanhydride, phthalic anhydride, pyromelliticanhydride, and trimellitic anhydride. Moreover, in a case where the acid anhydride group represents a divalent group, the divalent group means a group represented by *—CO—O—CO—* (* represents a bonding position).

In addition, in the present specification, a substituent or the like, which is not specified whether to be substituted or unsubstituted, may have an additional substituent (for example, a substituent group Y which will be described later), if possible, as long as the desired effect is not impaired. For example, the description of an "alkyl group" means a substituted or unsubstituted alkyl group (alkyl group that may have a substituent) as long as the desired effect is not impaired.

It should be noted that the expressions such as "may" in the present specification are intended to satisfy or do not satisfy the condition of "may". For example, "may have a substituent" also includes "may not have a substituent".

Furthermore, in the present specification, in a case where the description of "may have a substituent" appears, the kind of a substituent, the position of a substituent, and the number of substituents are not particularly limited. Examples of the number of substituents include 1 or 2 or more. Examples of the substituent include a monovalent nonmetallic atomic group excluding a hydrogen atom, and the substituent can be selected from the following substituent group Y.

In the present specification, examples of a halogen atom include a chlorine atom, a fluorine atom, a bromine atom, and an iodine atom.

(Substituent Group Y)

A halogen atom (—F, —Br, —Cl, —I, or the like), a hydroxyl group, an amino group, a carboxylic acid group and a conjugated base group thereof, a carboxylic acid anhydride group, a cyanate ester group, an unsaturated polymerizable group, an epoxy group, an oxetanyl group, an aziridinyl group, a thiol group, an isocyanate group, a thioisocyanate group, an aldehyde group, an alkoxy group, an aryloxy group, an alkylthio group, an arylthio group, an alkyldithio group, an aryldithio group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsufinyl group, an arylsulfinyl group, an alkylsulfonyl group, an arylsulfonyl group, a sulfo group ($—SO_3H$) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group ($—SO_2NHSO_2$(alkyl)) and a conjugated base group thereof, an N-arylsulfonylsulfamoyl group ($—SO_2NHSO_2$(aryl)) and a conjugated base group thereof, an N-alkylsulfonylcarbamoyl group ($—CONHSO_2$(alkyl)) and a conjugated base group thereof, an N-arylsulfonylcarbamoyl group ($—CONHSO_2$(aryl)) and a conjugated base group thereof, an alkoxysilyl group ($—Si(Oalkyl)_3$), an aryloxysilyl group ($—Si(Oaryl)_3$), a hydroxysilyl group ($—Si(OH)_3$) and a conjugated base group thereof, a phosphono group ($—PO_3H_2$) and a conjugated base group thereof, a dialkylphosphono group ($—PO_3(alkyl)_2$), a diarylphosphono group ($—PO_3(aryl)_2$), an alkylarylphosphono group ($—PO_3$(alkyl)(aryl)), a monoalkylphosphono group ($—PO_3H$(alkyl)) and a conjugated base group thereof, a monoarylphosphono group ($—PO_3H$(aryl)) and a conjugated base group thereof, a phosphonooxy group ($—OPO_3H_2$) and a conjugated base group thereof, a dialkylphosphonooxy group ($—OPO_3(alkyl)_2$), a diarylphosphonooxy group ($—OPO_3(aryl)_2$), an alkylarylphosphonooxy group ($—OPO_3$(alkyl)(aryl)), a monoalkylphosphonooxy group ($—OPO_3H$(alkyl)) and a conjugated base group thereof, a monoarylphosphonooxy group ($—OPO_3H$(aryl)) and a conjugated base group thereof, a cyano group, a nitro group, an aryl group, an alkenyl group, an alkynyl group, and an alkyl group.

Moreover, these substituents may or may not form a ring by being bonded to each other, if possible, or by being bonded to a group substituted with the substituent.

[Composition]

The composition according to the embodiment of the present invention contains a phenolic compound, an epoxy compound, a compound represented by Formula (1) described later (hereinafter, also referred to as "specific compound"), and an inorganic nitride.

The composition according to the embodiment of the present invention containing the above components (hereinafter, also referred to as "the present composition") has excellent thermally conductive properties and excellent handleability in a semi-cured state.

In the related art, by adding a curing accelerator to a composition for forming a thermally conductive material, the curing reaction proceeds at a lower temperature side as compared with a composition in which a curing accelerator is not added due to the action of the curing accelerator, and the curing of the composition is accelerated, and thus it is known that thermally conductive properties of the cured product can be improved.

As the thermal reaction behavior during a curing treatment in a case where a known curing accelerator such as triphenylphosphine was added to a composition containing a phenolic compound, an epoxy compound, and an inorganic nitride was checked using a differential scanning calorimetry (DSC), the present inventors found that since a starting temperature of the curing reaction drops too much as the peak temperature of the curing reaction drops, even if the curing treatment is stopped so that the curing reaction progresses rapidly at the start stage of the curing treatment to be in a semi-cured state, it becomes difficult to form a thermally conductive material having appropriate handleability.

As a result of intensive studies, the present inventors did not clarified the detailed mechanism, but found that in a case where the above specific compound is used as a curing accelerator in the composition containing a phenolic compound, an epoxy compound, and an inorganic nitride, since the starting temperature of the curing reaction is not dropped too much, it is possible to easily form a thermally conductive material in a semi-cured state having appropriate handleability, and since the peak temperature of the curing reaction is moderately decreased, it is possible to form a cured product having a high progress degree of curing reaction and excellent thermally conductive properties by performing further curing treatment to the thermally conductive material in a semi-cured state, thereby completing the present invention.

Hereinafter, each component contained in the composition will be described in detail.

[Phenolic Compound]

The composition according to the embodiment of the present invention contains a phenolic compound. The phenolic compound is a compound having at least one or more of phenolic hydroxyl groups.

The number of phenolic hydroxyl groups contained in the phenolic compound is preferably 2 or more, and more preferably 3 or more. An upper limit value is not particularly limited, but is preferably 10 or less.

The phenolic compound preferably has no epoxy group.

The phenolic compound is preferably one or more selected from the group consisting of the compound represented by General Formula (P1), the compound represented by General Formula (P2), and the phenolic compound having a triazine ring, and is more preferably a phenolic compound having a triazine ring, from a viewpoint of improving thermally conductive properties, withstand voltage, and peel strength of the thermally conductive material formed by using the composition.

<Compound Represented by General Formula (P1)>

A compound represented by General Formula (P1) is shown below.

(P1)

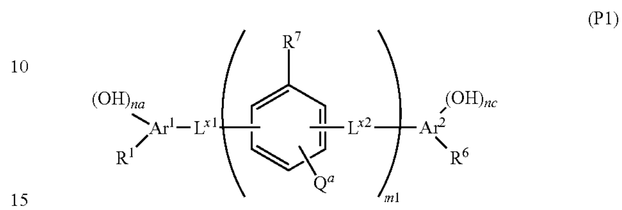

In General Formula (P1), m1 represents an integer of 0 or greater.

na and nc each independently represent an integer of 1 or greater.

$Ar^1$ and $Ar^2$ each independently represent a benzene ring group or a naphthalene ring group.

$R^1$ and $R^6$ each independently represent a hydrogen atom, a halogen atom, a carboxylic acid group, a boronic acid group, an aldehyde group, an alkyl group, an alkoxy group, or an alkoxycarbonyl group.

$L^{x1}$ represents a single bond, $—C(R^2)(R^3)—$, or —CO—, $L^{x2}$ is a single bond, $—C(R^4)(R^5)—$, or —CO—, and $R^2$ to $R^5$ each independently represent a hydrogen atom or a substituent.

$R^7$ represents a hydrogen atom or a hydroxyl group.

$Q^a$ represents a hydrogen atom, an alkyl group, a phenyl group, a halogen atom, a carboxylic acid group, a boronic acid group, an aldehyde group, an alkoxy group, or an alkoxycarbonyl group.

m1 is preferably an integer of 0 to 10, more preferably an integer of 0 to 3, even more preferably 0 or 1, and particularly preferably 1.

na and nc are each independently preferably an integer of 1 to 4, and more preferably 2 or 3.

$Ar^1$ and $Ar^2$ are preferably a benzene ring group.

The alkyl group represented by $R^1$ and $R^6$ may be linear or branched. The number of carbon atoms in the alkyl group is preferably 1 to 10. The alkyl group may have a substituent.

An alkyl group moiety in the alkoxy group represented by $R^1$ and $R^6$ and an alkyl group moiety in the alkoxycarbonyl group represented by $R^1$ and $R^6$ are the same as the above alkyl group.

$R^1$ and $R^6$ are each independently preferably a hydrogen atom or a halogen atom, more preferably a hydrogen atom or a chlorine atom, and even more preferably a hydrogen atom.

$L^{x1}$ is preferably $—C(R^2)(R^3)—$ or —CO—.

$L^{x2}$ is preferably $—C(R^4)(R^5)—$ or —CO—.

The substituents represented by $R^2$ to $R^5$ are each independently preferably a hydroxyl group, a phenyl group, a halogen atom, a carboxylic acid group, a boronic acid group, an aldehyde group, an alkyl group, an alkoxy group, or an alkoxycarbonyl group, and more preferably a hydroxyl group, a halogen atom, a carboxylic acid group, a boronic acid group, an aldehyde group, an alkyl group, an alkoxy group, or an alkoxycarbonyl group.

The alkyl groups represented by $R^2$ to $R^5$ may be linear or branched. The number of carbon atoms in the alkyl group is preferably 1 to 10. The alkyl group may have a substituent.

An alkyl group moiety in the alkoxy group represented by $R^2$ to $R^5$ and an alkyl group moiety in the alkoxycarbonyl group represented by $R^2$ to $R^5$ are the same as the above alkyl group.

The phenyl groups represented by $R^2$ to $R^5$ may have a substituent. In a case where the phenyl group has a substituent, the phenyl group preferably has 1 to 3 hydroxyl groups.

$R^2$ to $R^5$ are each independently preferably a hydrogen atom or a hydroxyl group and more preferably a hydrogen atom.

$L^{x1}$ and $L^{x2}$ are each independently preferably $—CH_2—$, —CH(OH)—, —CO—, or —CH(Ph)-, and $—CH_2—$ is more preferable. The above Ph represents a phenyl group which may have a substituent.

Furthermore, in General Formula (P1), in a case where there are a plurality of $R^4$'s, the plurality of $R^4$'s may be the same as or different from each other. In General Formula (P1), in a case where there are a plurality of $R^5$'s, the plurality of $R^5$'s may be the same as or different from each other.

In a case where m1 is an integer of 2 or greater, and there are a plurality of $R^7$'s, the plurality of $R^7$'s may be the same as or different from each other. $R^7$ is preferably a hydroxyl group. In addition, in a case where there are a plurality of $R^7$'s, it is preferable that at least one $R^7$ represents a hydroxyl group, and it is more preferable that all of the plurality of $R^7$'s represent a hydroxyl group.

The alkyl group represented by $Q^a$ may be linear or branched. The number of carbon atoms in the alkyl group is preferably 1 to 10. The alkyl group may have a substituent.

An alkyl group moiety in the alkoxy group represented by $Q^a$ and an alkyl group moiety in the alkoxycarbonyl group represented by $Q^a$ are the same as the above alkyl group.

The phenyl group represented by $Q^a$ may have a substituent.

$Q^a$ is preferably bonded to a para-position with respect to a hydroxyl group that a benzene ring group, to which $Q^a$ is bonded, may have.

$Q^a$ is preferably a hydrogen atom or an alkyl group, more preferably a hydrogen atom or a methyl group, and even more preferably a methyl group.

In a case where m1 is an integer of 2 or greater and there are a plurality of $L^{x2}$ and/or $Q^a$, the plurality of $L^{x2}$ and/or $Q^a$ may be the same as or different from each other.

As the compound represented by General Formula (P1), in General Formula (P1), a combination in which m1 is 0 or 1 (more preferably 1), na and nc are integers of 1 to 4 (more preferably 2 or 3), $Ar^1$ and $Ar^2$ represent a benzene ring group, $R^1$ and $R^6$ represent a hydrogen atom, $L^{x1}$ and $L^{x2}$ represent $—CH_2—$, $R^7$ represents a hydroxyl group, and $Q^a$ represents a hydrogen atom or a methyl group (more preferably a methyl group) is preferable.

<Compound Represented by General Formula (P2)>

A compound represented by General Formula (P2) is shown below.

(P2)

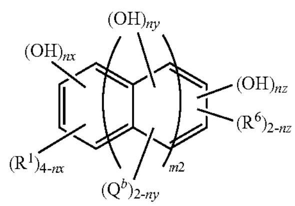

In General Formula (P2), m2 represents an integer of 0 or greater.

nx represents an integer of 0 to 4.

ny represents an integer of 0 to 2.

nz represents an integer of 0 to 2.

$R^1$ and $R^6$ each independently represent a hydrogen atom, a halogen atom, a carboxylic acid group, a boronic acid group, an aldehyde group, an alkyl group, an alkoxy group, or an alkoxycarbonyl group.

$Q^b$ represents a hydrogen atom, an alkyl group, a phenyl group, a halogen atom, a carboxylic acid group, a boronic acid group, an aldehyde group, an alkoxy group, or an alkoxycarbonyl group.

m2 is preferably an integer of 0 to 10, and is more preferably an integer of 0 to 4.

nx is preferably 1 or 2, and more preferably 2.

In a case where there are a plurality of ny's, the plurality of ny's may be the same as or different from each other.

Among these ny's that may exist in plurality, at least one ny preferably represents 1. For example, in a case where m2 represents 1, it is preferable that one existing ny represents 1. In a case where m2 represents 4, at least one of the four existing ny's preferably represents 1, and more preferably two ny's represent 1.

nz is preferably 1.

In General Formula (P2), the total number of nx, ny that may exist in a plurality of ny, and nz is preferably an integer of 2 or greater, and more preferably an integer of 2 to 10.

$R^1$ and $R^6$ in General Formula (P2) may be the same as matters described on $R^1$ and $R^6$ in General Formula (P1) including the preferred embodiments thereof.

In a case where there are a plurality of $R^1$'s, the plurality of $R^1$'s may be the same as or different from each other. In a case where there are a plurality of $R^6$'s, the plurality of $R^6$'s may be the same as or different from each other.

The alkyl group represented by $Q^b$ may be linear or branched. The number of carbon atoms in the alkyl group is preferably 1 to 10. The alkyl group may have a substituent.

An alkyl group moiety in the alkoxy group represented by $Q^b$ and an alkyl group moiety in the alkoxycarbonyl group represented by $Q^b$ are the same as the alkyl group represented by $Q^b$.

The phenyl group represented by $Q^b$ may have a substituent.

$Q^b$ is preferably a hydrogen atom.

In a case where there are a plurality of $Q^b$'s, the plurality of $Q^b$'s may be the same as or different from each other.

Examples of the compound represented by General Formula (P2) include benzenetriol, and 1,3,5-benzenetriol is preferable.

<Phenolic Compound Having a Triazine Ring>

The phenolic compound having a triazine ring has a structure in which the triazine ring group is bonded to an aromatic ring group having a phenolic hydroxyl group via a single bond or a divalent linking group.

Examples of the phenolic compound having a triazine ring include compounds represented by the following General Formula (P3).

(P3)

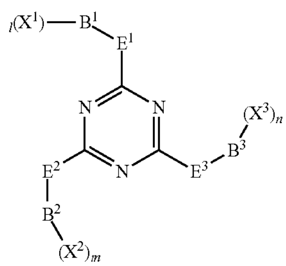

In General Formula (P3), $E^1$ to $E^3$ each independently represent a single bond, —NH—, or —NR—. R represents a substituent.

$B^1$ to $B^3$ each independently represent an aromatic hydrocarbon ring group which may have a substituent.

$X^1$ to $X^3$ each independently represent a hydroxyl group.

l, m, and n each independently represent an integer of 0 or greater.

The sum of 1, m, and n is 2 or greater.

As R in a case where $E^1$ to $E^3$ represent —NR—, a linear or branched alkyl group having 1 to 5 carbon atoms is preferable. In a case where two or three of $E^1$ to $E^3$ represent —NR—, the plurality of R's may be the same as or different from each other.

Among them, from a viewpoint that the thermally conductive properties of the thermally conductive material are more excellent, $E^1$ to $E^3$ are each independently preferably a single bond or —NH—. The reason for this is considered to be that in a case where $E^1$ to $E^3$ are the above group, thermally conductive properties due to a thermally conductive pass formed of a compound represented by General Formula (P3) and an inorganic nitride are further enhanced.

$B^1$ to $B^3$ are bonded to $E^1$ to $E^3$ and $X^1$ to $X^3$ by ring-member atoms constituting the above aromatic hydrocarbon ring group, respectively.

$B^1$ to $B^3$ may be a benzene ring group or a polycyclic aromatic hydrocarbon ring group. The number of rings constituting the above polycyclic aromatic hydrocarbon ring group is preferably 2 to 4, more preferably 2 or 3.

Examples of $B^1$ to $B^3$ include a benzene ring group, a naphthalene ring group, and an anthracene ring group. Among them, $B^1$ to $B^3$ are each independently preferably a benzene ring group or a naphthalene ring group, and more preferably a benzene ring group.

In General Formula (P3), 1, m, and n are each independently preferably 1 to 5, more preferably 1 or 2, and even more preferably 1.

In a case where 1 is 0, $B^1$ does not have a hydroxyl group. In a case where m is 0, $B^2$ does not have a hydroxyl group. In a case where n is 0, $B^3$ does not have a hydroxyl group.

$B^1$ to $B^3$ may have a substituent other than a hydroxyl group. Examples of the substituent other than the hydroxyl group that B1 to $B^3$ may have include a group represented by the following General Formula (P4). In a case where the aromatic ring groups of $B^1$ to $B^3$ have a plurality of substituents, the plurality of substituents may be bonded to each other to form a non-aromatic ring.

(P4)

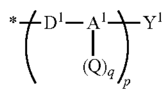

In General Formula (P4), * represents a bonding position with any of $B^1$ to $B^3$.

p represents an integer of 0 or greater.

q represents an integer of 0 to 2.

$D^1$ represents a single bond or a divalent linking group.

$A^1$ represents an aromatic ring group which may have a substituent or a cycloalkane ring group which may have a substituent.

Q and $Y^1$ each independently represent a specific functional group selected from the group consisting of an aldehyde group (—CHO), a boronic acid group (—$B(OH)^2$), a hydroxyl group (—OH), an amino group, a thiol group (—SH), a carboxylic acid group (—COOH), a monovalent group having a carboxylic acid anhydride group, an isocyanate group (—NCO), and a monovalent group having an oxetanyl group.

However, in a case where p is 0, $Y^1$ represents a specific functional group other than the hydroxyl group.

In General Formula (P4), examples of the divalent linking group represented by $D^1$ include —O—, —S—, —CO—, —$NR^N$—, —$SO_2$—, an alkylene group, and a group consisting of a combination of these groups. $R^N$ in —$NR^N$— represents a hydrogen atom or a substituent. The alkylene group is preferably a linear or branched alkylene group having 1 to 8 carbon atoms.

Among them, $D^1$ is preferably a "single bond" or a "linking group obtained by a combination selected from the group consisting of —O—, —CO—, and an alkylene group", and more preferably a single bond, $*^A$-alkylene group —O—CO—$*^B$, $*^A$—CO—O-alkylene group-$*^B$, $*^A$—O-alkylene group-$*^B$, $*^A$—CO—O-alkylene group-O—CO—$*^B$, $*^A$—CO—O-alkylene group-O—$*^B$, or $*^A$—O-alkylene group-O—CO—$*^B$.

$*^A$ is a bonding position on a side opposite to $A^1$, and $*^B$ is a bonding position to $A^1$. In General Formula (P4), p is preferably 0 to 5, more preferably 0 or 1.

In a case where p is 0, $Y^1$ is directly bonded to any of $B^1$ to $B^3$. That is, in a case where p is 0, $X^1$ to $X^3$ represent the specific functional group itself other than the hydroxyl group.

In General Formula (P4), q is preferably 0 or 1.

In General Formula (P4), $A^1$ is bonded to $D^1$, $Y^1$, and Q by an atom constituting the aromatic ring group or the cycloalkane ring group.

The number of carbon atoms constituting the aromatic ring group represented by $A^1$ is preferably 6 or greater, and more preferably 6 to 12. In addition, the number of carbon atoms constituting the cycloalkane ring group represented by $A^1$ is preferably 6 or greater, and more preferably 6 to 12.

The aromatic ring group represented by $A^1$ may be a monocyclic aromatic ring group or a polycyclic aromatic ring group.

The number of ring members of the monocyclic aromatic ring group is preferably 6 to 10.

The number of rings constituting the polycyclic aromatic ring group is preferably 2 to 4, and more preferably 2. The number of ring members of the rings constituting the polycyclic aromatic ring group is each independently preferably 5 to 10.

The aromatic ring group may be an aromatic hydrocarbon ring group, or may be an aromatic heterocyclic group.

The number of heteroatoms contained in the aromatic heterocyclic group is preferably 1 to 5. Examples of the heteroatom include a nitrogen atom, a sulfur atom, an oxygen atom, a selenium atom, a tellurium atom, a phosphorus atom, a silicon atom, and a boron atom. Among them, a nitrogen atom, a sulfur atom, or an oxygen atom is preferable.

The substituent that the aromatic ring group represented by $A^1$ may have is preferably a substituent other than the substituent represented by General Formula (P4). In a case where the aromatic ring group represented by $A^1$ has a plurality of substituents, the plurality of substituents may be bonded to each other to form a non-aromatic ring.

In a case where the aromatic ring group represented by $A^1$ has a plurality of substituents and the plurality of substituents are bonded to each other to form a non-aromatic ring, the number of carbon atoms contained only in the above non-aromatic ring is not counted in the number of carbon atoms constituting the above aromatic ring group. On the other hand, the number of carbon atoms shared by the aromatic ring and the non-aromatic ring in the aromatic ring group is counted as the number of carbon atoms constituting the above aromatic ring group.

Examples of the aromatic ring group represented by $A^1$ include a benzene ring group, a naphthalene ring group, an anthracene ring group, a benzothiazole ring group, a carbazole ring group, an indole ring group, and the like, and a benzene ring group or a naphthalene ring group is preferable.

The aromatic ring group represented by $A^1$ preferably has no substituent other than $Y^1$ and Q which may exist in a plurality.

The cycloalkane ring group represented by $A^1$ may be monocyclic or polycyclic.

The number of ring members of the above monocyclic cycloalkane ring group is preferably 6 to 10.

The number of rings constituting the polycyclic cycloalkane ring group is preferably 2 to 4, and more preferably 2. The number of ring members of the rings constituting the polycyclic cycloalkane ring group is each independently preferably 5 to 10.

In a case where the above cycloalkane ring group has a plurality of substituents, the plurality of substituents may be bonded to each other to form a ring other than the cycloalkane ring.

In a case where the above cycloalkane ring group has a plurality of substituents, and the plurality of substituents are bonded to each other to form a ring other than the cycloalkane ring, the number of carbon atoms contained only in the ring other than the above cycloalkane ring is not counted in the number of carbon atoms constituting the above cycloalkane ring group. Moreover, the number of carbon atoms shared by the cycloalkane ring and the ring other than the cycloalkane ring in the above cycloalkane ring group is counted as the number of carbon atoms constituting the cycloalkane ring group.

Examples of the cycloalkane ring group represented by $A^1$ include a cyclohexane ring group, a cycloheptane ring group, a norbornane ring group, and an adamantane ring group.

In General Formula (P4), Q and $Y^1$ each independently represent the above specific functional group.

That is, the group represented by General Formula (P4) is a group having at least one specific functional group. Here, in a case where the group represented by General Formula (P4) is "a group having a specific functional group", the group represented by General Formula (P4) may be a group containing a specific functional group as a portion, or the group represented by General Formula (P4) may be a specific functional group itself.

The amino group as the specific functional group is not particularly limited and may be any of a primary amino group, a secondary amino group, and a tertiary amino group. Examples of the amino group include a group represented by $—N(R^E)_2$($R^E$ is each independently a hydrogen atom or an alkyl group (which may be linear or branched)). The number of carbon atoms in the above alkyl group is, for example, preferably 1 to 10, for example, more preferably 1 to 6, and, for example, even more preferably 1 to 3. The alkyl group may further have a substituent.

Examples of the monovalent group having a carboxylic acid anhydride group as the specific functional group include a group obtained by removing any hydrogen atom from maleic anhydride, phthalic anhydride, pyromellitic anhydride, and trimellitic anhydride.

Examples of the monovalent group having an oxetanyl group as the specific functional group include a group represented by "-$L^{eo}$-oxetanyl group". $L^{eo}$ represents a single bond or a divalent linking group, and an oxygen atom, an alkylene group (more preferably a linear or branched alkylene group having 1 to 6 carbon atoms), or a group consisting of a combination of these groups is preferable.

Among them, the above monovalent group having an oxetanyl group is preferably "—O-alkylene group-oxetanyl group".

As the substituent that the oxetanyl group may have, a linear or branched alkyl group having 1 to 6 carbon atoms is preferable.

Among them, the specific functional group is preferably an aldehyde group, a boronic acid group, or a hydroxyl group. In other words, Q and $Y^1$ are each independently preferably an aldehyde group, a boronic acid group, or a hydroxyl group.

In a case where the compound represented by General Formula (P3) has a plurality of groups represented by General Formula (P4), the groups represented by the plurality of General Formulae (P4) may be the same as or different from each other.

In General Formula (P3), the total number of 1, m, and n is preferably 2 to 10, and more preferably 3 to 6.

In addition, the total number of phenolic hydroxyl groups contained in the compound represented by General Formula (P3) is preferably 2 to 10, and more preferably 3 to 6.

In General Formula (P3), it is preferable that B1 has one or more hydroxyl groups, $B^2$ has one or more hydroxyl groups, and $B^3$ has one or more hydroxyl groups, and it is more preferable that $B^1$ has 1 or 2 hydroxyl groups, $B^2$ has 1 or 2 hydroxyl groups, and $B^3$ has 1 or 2 hydroxyl groups.

In addition, in General Formula (P3), the atoms in $B^1$ to $B^3$ to which $E^1$ to $E^3$ are directly bonded and the atoms in $B^1$ to $B^3$ that exist adjacent to each other are preferably -unsubstituted with each other.

The compound represented by General Formula (P3) is preferably a compound represented by the following General Formula (P5).

(P5)

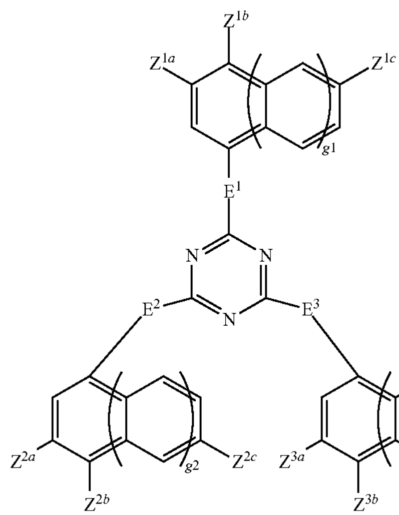

In General Formula (P5), $E^1$ to $E^3$ are the same as $E^1$ to $E^3$ in General Formula (P3), including a preferred embodiment.

In General Formula (P5), $g^1$ to $g^3$ each independently represent 0 or 1.

In General Formula (P5), $Z^{1a}$ to $Z^{1c}$, $Z^{2a}$ to $Z^{2c}$, and $Z^{3a}$ to $Z^{3c}$ each independently represent a hydrogen atom or a hydroxyl group.

However, among $Z^{1a}$ to $Z^{1c}$, $Z^{2a}$ to $Z^{2c}$, and $Z^{3a}$ to $Z^{3c}$, a total of two or more represent hydroxyl groups.

$g^1$ to $g^3$ preferably represent 0.

Among $Z^{1a}$ to $Z^{1c}$, $Z^{2a}$ to $Z^{2c}$, and $Z^{3a}$ to $Z^{3c}$, 2 to 9 preferably represent a hydroxyl group, and 3 to 6 more preferably represent a hydroxyl group.

In General Formula (P3), it is preferable that one or more of $Z^{1a}$ to $Z^{1c}$ represents a hydroxyl group, one or more of $Z^{2a}$ to $Z^{2c}$ represent a hydroxyl group, and one or more of $Z^{3a}$ to $Z^{3c}$ represent a hydroxyl group, and it is more preferable that one or two of $Z^{1a}$ to $Z^{1c}$ represent a hydroxyl group, one or two of $Z^{2a}$ to $Z^{2c}$ represent a hydroxyl group, and one or two of $Z^{3a}$ to $Z^{3c}$ represent a hydroxyl group.

The phenolic compound may be a compound represented by General Formula (P1), a compound represented by General Formula (P2), and other phenolic compounds other than the phenolic compound having a triazine ring.

In addition to the other phenolic compounds, examples thereof include a biphenyl aralkyl-type phenolic resin, a phenol novolac resin, a cresol novolac resin, an aromatic hydrocarbon formaldehyde resin-modified phenolic resin, a dicyclopentadiene phenol addition-type resin, a phenol aralkyl resin, a polyhydric phenol novolac resin synthesized from a polyhydric hydroxy compound and formaldehyde, a naphthol aralkyl resin, a trimethylolmethane resin, a tetraphenylolethane resin, a naphthol novolac resin, a naphthol phenol co-condensed novolac resin, a naphthol cresol co-condensed novolac resin, a biphenyl-modified phenolic resin, a biphenyl-modified naphthol resin, an aminotriazine-modified phenolic resin, and an alkoxy group-containing aromatic ring-modified novolac resin.

A lower limit value of the hydroxyl group content of the phenolic compound is preferably 3.0 mmol/g or greater, more preferably 8.0 mmol/g or greater, even more preferably 11.0 mmol/g or greater, particularly preferably 12.0 mmol/g or greater, and most preferably 13.0 mmol/g or greater. An upper limit value thereof is preferably 25.0 mmol/g or less, and more preferably 23.0 mmol/g or less.

Moreover, the hydroxyl group content means the number of hydroxyl groups (preferably, phenolic hydroxyl groups) contained in 1 g of the phenolic compound.

In addition, the phenolic compound may have an active hydrogen-containing group (carboxylic acid group or the like) capable of a polymerization reaction with an epoxy compound, in addition to the hydroxyl group. A lower limit value of the active hydrogen content of the phenolic compound (total content of hydrogen atoms in hydroxyl groups, carboxylic acid groups, and the like) is preferably 8.0 mmol/g or greater, more preferably 10.5 mmol/g or greater, even more preferably 11.0 mmol/g or greater, particularly preferably 12.0 mmol/g or greater, and most preferably 13.0 mmol/g or greater. An upper limit value thereof is preferably 25.0 mmol/g or less, and more preferably 23.0 mmol/g or less.

A molecular weight of the phenolic compound is preferably 1,000 or less, more preferably 800 or less, even more preferably 600 or less, and particularly preferably 500 or less, from a viewpoint that the thermally conductive properties of the thermally conductive material is more excellent. A lower limit value thereof is preferably 110 or greater and more preferably 300 or greater.

One kind of the phenolic compounds may be used singly, or two or more kinds thereof may be used.

The content of the phenolic compound is preferably 1.0% to 25.0% by mass, and more preferably 3.0% to 20.0% by mass, with respect to the total solid content of the composition.

In addition, the "total solid content" of the composition is intended to mean a component for forming a thermally conductive material contained in the composition, and does not contain a solvent. Here, the component for forming a thermally conductive material may be a component of which chemical structure changes by reacting (polymerizing) at a time of forming the thermally conductive material. In addition, in a case where the component is a component for forming a thermally conductive material, even if the property thereof is liquid, the component is regarded as a solid content.

In addition to the phenolic compound, the present composition may contain a compound having a group capable of reacting with an epoxy compound described later (also referred to as "another active hydrogen-containing compound").

In a case where the present composition contains the phenolic compound and also contains other active hydrogen-containing compounds, a mass ratio (content of other active hydrogen-containing compounds/content of phenolic compound) of a content of the other active hydrogen-containing compounds to the content of the phenolic compound in the present composition is preferably 0 to 1, more preferably 0 to 0.1, and even more preferably 0 to 0.05.

[Epoxy Compound]

The composition according to the embodiment of the present invention contains an epoxy compound.

The epoxy compound is a compound having at least one epoxy group (oxiranyl group) in one molecule.

The epoxy group may further have a substituent, if possible. Examples of the substituent that the epoxy group may have include a linear or branched alkyl group having 1 to 5 carbon atoms.

The number of epoxy groups contained in the epoxy compound is preferably 2 or greater, more preferably 2 to 40, even more preferably 2 to 10, and particularly preferably 2, in one molecule.

A molecular weight of the epoxy compound is preferably 150 to 10,000, and more preferably 150 to 2,000.

A lower limit value of the epoxy group content of the epoxy compound is preferably 2.0 mmol/g or greater, more preferably 4.0 mmol/g or greater, and even more preferably 5.0 mmol/g or greater. The upper limit value thereof is preferably 20.0 mmol/g or less and more preferably 15.0 mmol/g or less.

The epoxy group content means the number of epoxy groups contained in 1 g of the epoxy compound.

The epoxy compound is preferably liquid at normal temperature (23° C.).

The epoxy compound preferably has an aromatic ring group, and more preferably has an aromatic hydrocarbon ring group.

The epoxy compound may or may not exhibit liquid crystallinity.

That is, the epoxy compound may be a liquid crystal compound. In other words, a liquid crystal compound having an epoxy group can also be used as the epoxy compound.

Examples of the epoxy compound (which may be a liquid crystalline epoxy compound) include a compound (rod-like compound) which has a rod-like structure in at least a portion thereof, and a compound (disk-like compound) which has a disk-like structure in at least a portion thereof.

Hereinafter, the rod-like compound and the disk-like compound will be described in detail.

(Rod-Like Compound)

Examples of the epoxy compounds, which are rod-like compounds, include azomethine compound, azoxy compound, cyanobiphenyl compound, cyanophenyl ester compound, benzoic acid ester compound, cyclohexane carboxylic acid phenyl ester compound, cyanophenyl cyclohexane compound, cyano-substituted phenylpyrimidine compound, alkoxy-substituted phenylpyrimidine compound, phenyldioxane compound, tolane compound, and alkenylcyclohexyl benzonitrile compound. In addition to these low-molecular-weight compounds described above, high-molecular-weight compounds can also be used. The high-molecular-weight compounds are high-molecular-weight compounds obtained by polymerizing rod-like compounds having a low-molecular-weight reactive group.

Examples of a preferred rod-like compound include a rod-like compound represented by General Formula (XXI).

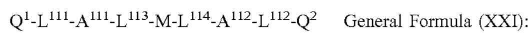

$Q^1$-$L^{111}$-$A^{111}$-$L^{113}$-M-$L^{114}$-$A^{112}$-$L^{112}$-$Q^2$ General Formula (XXI):

In General Formula (XXI), $Q^1$ and $Q^2$ are each independently an epoxy group, and $L^{111}$, $L^{112}$, $L^{113}$, and $L^{114}$ each independently represent a single bond or a divalent linking group. $A^{111}$ and $A^{112}$ each independently represent a divalent linking group (spacer group) having 1 to 20 carbon atoms. M represents a mesogenic group.

The epoxy group of $Q^1$ and $Q^2$ may or may not have a substituent.

In General Formula (XXI), $L^{111}$, $L^{112}$, $L^{113}$, and $L^{14}$ each independently represent a single bond or a divalent linking group.

The divalent linking groups represented by $L^{111}$, $L^{112}$, $L^{113}$, and $L^{114}$ are preferably each independently a divalent linking group selected from the group consisting of —O—, —S—, —CO—, —$NR^{112}$—, —CO—O—, —O—CO—O—, —CO—$NR^{112}$—, —$NR^{112}$—CO—, —O—CO—, —$CH_2$—O—, —O—$CH_2$—, —O—CO—$NR^{112}$—, —$NR^{112}$—CO—O—, and —$NR^{112}$—CO—$NR^{112}$—. $R^{112}$ is a hydrogen atom or an alkyl group having 1 to 7 carbon atoms.

Among them, $L^{113}$ and $L^{114}$ are each independently preferably —O—.

$L^{111}$ and $L^{112}$ are each independently preferably a single bond.

In General Formula (XXI), $A^{111}$ and $A^{112}$ each independently represent a divalent linking group having 1 to 20 carbon atoms.

The divalent linking group may contain heteroatoms such as non-adjacent oxygen atoms and sulfur atoms. Among them, an alkylene group, an alkenylene group, or an alkynylene group, having 1 to 12 carbon atoms, are preferable. The alkylene group, alkenylene group, or alkynylene group may or may not have an ester group.

The divalent linking group is preferably linear, and the divalent linking group may or may not have a substituent. Examples of the substituent include a halogen atom (fluorine atom, chlorine atom, and bromine atom), a cyano group, a methyl group, and an ethyl group.

Among them, $A^{111}$ and $A^{112}$ are each independently preferably an alkylene group having 1 to 12 carbon atoms, and more preferably a methylene group.

In General Formula (XXI), M represents a mesogenic group. Examples of the mesogenic group include a known mesogenic group. Among them, a group represented by General Formula (XXII) is preferable.

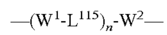

—$(W^1$-$L^{115})_n$-$W^2$— General Formula (XXII):

In General Formula (XXII), $W^1$ and $W^2$ each independently represent a divalent cyclic alkylene group, a divalent cyclic alkenylene group, an arylene group, or a divalent heterocyclic group. $L^{115}$ represents a single bond or a divalent linking group. n represents an integer of 1 to 4.

Examples of $W^1$ and $W^2$ include 1,4-cyclohexanediyl, 1,4-cyclohexenediyl, 1,4-phenylene, pyrimidine-2,5-diyl, pyridine-2,5-diyl, 1,3,4-thiadiazole-2,5-diyl, 1,3,4-oxadiazole-2,5-diyl, naphthalene-2,6-diyl, naphthalene-1,5-diyl, thiophene-2,5-diyl, and pyridazine-3,6-diyl. In a case of 1,4-cyclohexanediyl, the group may be any one isomer of structural isomers of a trans-isomer and a cis-isomer, or a mixture in which the isomers are mixed at arbitrary ratio. Among them, the trans-isomer is preferable.

$W^1$ and $W^2$ may each have a substituent. Examples of the substituent include groups exemplified in the aforementioned substituent group Y, and more specific examples thereof include a halogen atom (fluorine atom, chlorine atom, bromine atom, and iodine atom), a cyano group, an alkyl group having 1 to 10 carbon atoms (for example, methyl group, ethyl group, propyl group, and the like), an alkoxy group having 1 to 10 carbon atoms (for example, methoxy group, ethoxy group, and the like), an acyl group having 1 to 10 carbon atoms (for example, formyl group, acetyl group, and the like), an alkoxycarbonyl group having 1 to 10 carbon atoms (for example, methoxycarbonyl group, ethoxycarbonyl group, and the like), an acyloxy group having 1 to 10 carbon atoms (for example, acetyloxy group, propionyloxy group, and the like), a nitro group, a trifluoromethyl group, a difluoromethyl group, and the like.

In a case where there are a plurality of $W^1$'s, the plurality of $W^1$'s may be the same as or different from each other.

In General Formula (XXII), $L^{115}$ represents a single bond or a divalent linking group. As the divalent linking group represented by $L^{115}$, a specific example of the aforementioned divalent linking group represented by $L^{111}$ to $L^{114}$ is exemplified, and examples thereof include —CO—O—, —O—CO—, —$CH_2$—O—, and —O—$CH_2$—.

In a case where there are a plurality of $L^{115}$'s, the plurality of $L^{115}$'s may be the same as or different from each other.

Preferable skeletons in a basic skeleton of the mesogenic group represented by General Formula (XXII) are exemplified below. The mesogenic group may be substituted with substituents on these skeletons.

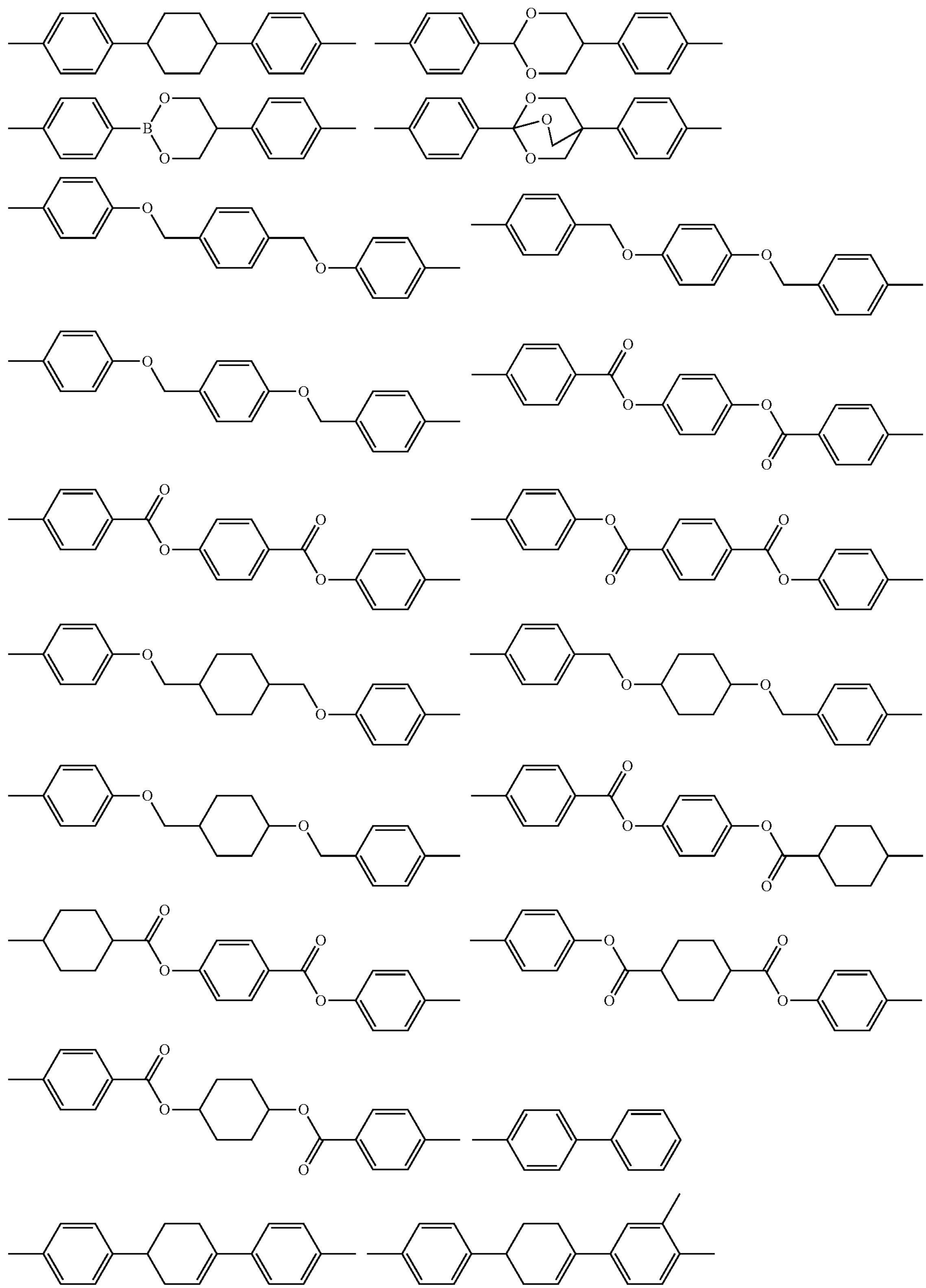

-continued

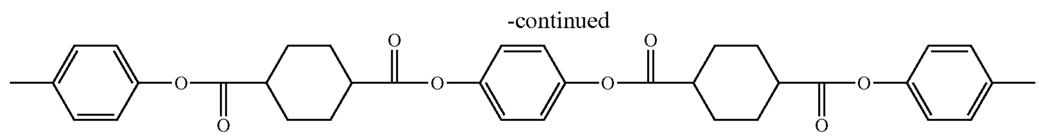

Among the skeletons, a biphenyl skeleton is preferable from a viewpoint of more excellent thermally conductive properties of the obtained thermally conductive material.

The compound represented by General Formula (XXI) can be synthesized by referring to the method disclosed in JP1999-513019A (JP-H11-513019A) (WO97/000600A).

The rod-like compound may be a monomer having a mesogenic group disclosed in JP1999-323162A (JP-H11-323162A) and JP4118691B.

Among them, the rod-like compound is preferably a compound represented by General Formula (E1).

(E1)

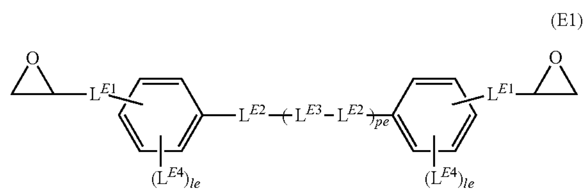

In General Formula (E1), $L^{E1}$'s each independently represent a single bond or a divalent linking group.

Among them, $L^{E1}$ is preferably a divalent linking group.

The divalent linking group is preferably —O—, —S—, —CO—, —NH—, —CH═CH—, —C≡C—, —CH═N—, —N═CH—, —N═N—, an alkylene group which may have a substituent, or a group obtained by combining two or more thereof, and more preferably —O-alkylene group- or -alkylene group-O—.

Moreover, the above alkylene group may be any one of linear, branched, or cyclic, but is preferably a linear alkylene group having 1 or 2 carbon atoms.

The plurality of $L^{E1}$'s may be the same as or different from each other.

In General Formula (E1), $L^{E2}$'s each independently represent a single bond, —CH═CH—, —CO—O—, —O—CO—, —C(—$CH_3$)═CH—, —CH═C(—$CH_3$)—, —CH═N—, —N═CH—, —N═N—, —C≡C—, —N═$N^+$(—$O^-$)—, —$N^+$(—$O^-$)═N—, —CH═N*(—$O^-$)—, —$N^+$(—$O^-$)═CH—, —CH═CH—CO—, —CO—CH═CH—, —CH═C(—CN)—, or —C(—CN)═CH—.

Among them, $L^{E2}$'s are each independently preferably a single bond, —CO—O—, or —O—CO—.

In a case where there are a plurality of $L^{E2}$'s, the plurality of $L^{E2}$'s may be the same as or different from each other.

In General Formula (E1), $LE^3$'s each independently represent a single bond, a 5-membered or 6-membered aromatic ring group or a 5-membered or 6-membered non-aromatic ring group, which may have a substituent, or a polycyclic group including these rings.

Examples of the aromatic ring group and non-aromatic ring group represented by $L^{E3}$ include a 1,4-cyclohexanediyl group, a 1,4-cyclohexenediyl group, a 1,4-phenylene group, a pyrimidine-2,5-diyl group, a pyridine-2,5-diyl group, a 1,3,4-thiadiazole-2,5-diyl group, a 1,3,4-oxadiazole-2,5-diyl group, a naphthalene-2,6-diyl group, a naphthalene-1,5-diyl group, a thiophene-2,5-diyl group, and a pyridazine-3,6-diyl group, each of which may have a substituent. In a case of the 1,4-cyclohexanediyl group, the group may be any one isomer of structural isomers of a trans-isomer and a cis-isomer, or a mixture in which the isomers are mixed at arbitrary ratio. Among them, the trans-isomer is preferable.

Among them, $L^{E3}$ is preferably a single bond, a 1,4-phenylene group, or a 1,4-cyclohexenediyl group.

The substituents contained in the groups represented by $L^{E3}$ are each independently preferably an alkyl group, an alkoxy group, a halogen atom, a cyano group, a nitro group, or an acetyl group, more preferably an alkyl group, and even more preferably a methyl group.

In a case where there are a plurality of substituents, these substituents may be the same as or different from each other.

In a case where there are a plurality of $L^{E3}$'s, the plurality of $L^{E3}$'s may be the same as or different from each other.

In General Formula (E1), pe represents an integer of 0 or greater.

In a case where pe is an integer of 2 or greater, a plurality of (-$L^{E3}$-$L^{E2}$-)'s may be the same as or different from each other.

Among them, pe is preferably 0 to 2, more preferably 0 or 1, and even more preferably 0.

In General Formula (E1), $L^{E4}$'s each independently represent a substituent.

The substituents represented by $L^{E4}$'s are each independently preferably an alkyl group, an alkoxy group, a halogen atom, a cyano group, a nitro group, or an acetyl group, more preferably an alkyl group, and even more preferably a methyl group.

A plurality of $L^{E4}$'s may be the same as or different from each other. In addition, in a case where le described below is an integer of 2 or greater, the plurality of $L^{E4}$'s present in the same $(L^{E4})_{le}$ may also be the same as or different from each other.

In General Formula (E1), le's each independently represent an integer of 0 to 4.

Among them, le's are each independently preferably 0 to 2.

A plurality of le's may be the same as or different from each other.

The rod-like compound preferably has a biphenyl skeleton from a viewpoint of more excellent thermally conductive properties of the obtained thermally conductive material.

In other words, the epoxy compound preferably has a biphenyl skeleton, and the epoxy compound in this case is more preferably a rod-like compound.

(Disk-Like Compound)

The epoxy compound, which is a disk-like compound, has a disk-like structure in at least a portion thereof.

The disk-like structure has at least an alicyclic ring or an aromatic ring. In particular, in a case where the disk-like structure has an aromatic ring, the disk-like compound can form a columnar structure by forming a stacking structure based on the intermolecular π-π interaction.

Examples of the disk-like structure include the triphenylene structure described in Angew. Chem. Int. Ed. 2012, 51, 7990-7993, or JP1995-306317A (JP-H7-306317A), and the trisubstituted benzene structures described in JP2007-002220A and JP2010-244038A.

The disk-like compound preferably has three or more epoxy groups. The cured product of the composition including the disk-like compound having three or more epoxy groups tends to have a high glass transition temperature and high heat resistance.

The number of epoxy groups contained in the disk-like compound is preferably 8 or less and more preferably 6 or less.

Specific examples of disk-like compounds include C. Destrade et al., Mol. Crysr. Liq. Cryst., vol. 71, page 111 (1981); Chemical Society of Japan, Quarterly Review of Chemistry, No. 22, Chemistry of Liquid Crystal, Chapter 5, Chapter 10, Section 2 (1994); B. Kohne et al., Angew. Chem. Soc. Chem. Comm., page 1794 (1985); J. Zhang et al., J. Am. Chem. Soc., vol. 116, page 2655 (1994), and a compound having at least one of terminal ends (preferably three or more) as an epoxy group in the compound described in U.S. Pat. No. 4,592,225 and the like.

Examples of the disk-like compound include compounds which have at least one (preferably, three or more) of terminal ends as an epoxy group in the triphenylene structure described in Angew. Chem. Int. Ed. 2012, 51, 7990-7993, and JP1995-306317A (JP-H7-306317A) and the trisubstituted benzene structures described in JP2007-002220A and JP2010-244038A.

As the disk-like compound, a compound represented by any of Formulae (D1) to (D16) shown below is preferable from the viewpoint of more excellent thermally conductive properties of the thermally conductive material.

First, Formulae (D1) to (D15) will be described, and then Formula (D16) will be described.

In the following formulae, "-LQ" represents "-L-Q", and "QL-" represents "Q-L-".

(D1)

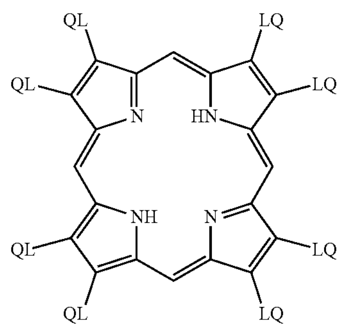

(D2)

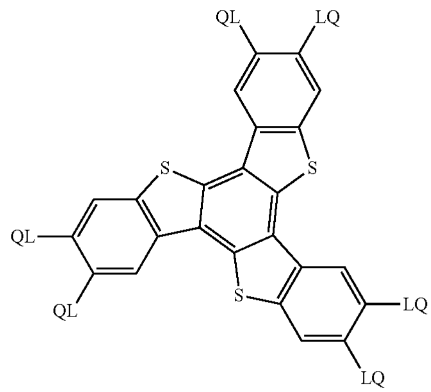

-continued (D3)

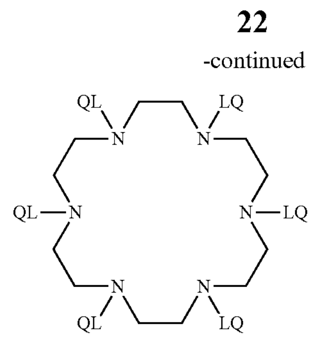

(D4)

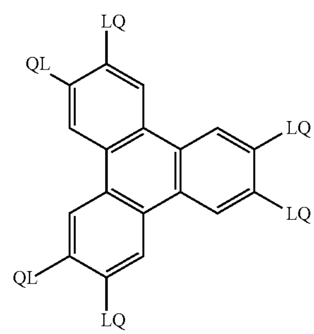

(D5)

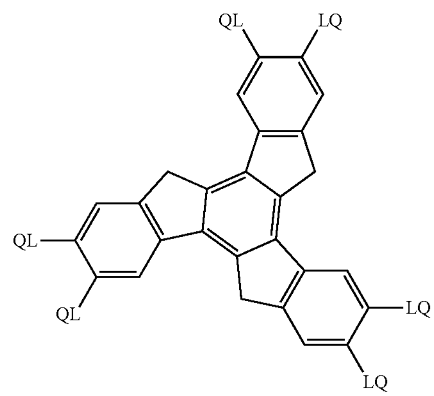

(D6)

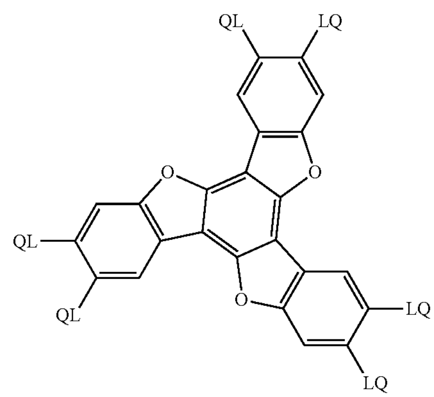

-continued
(D7)
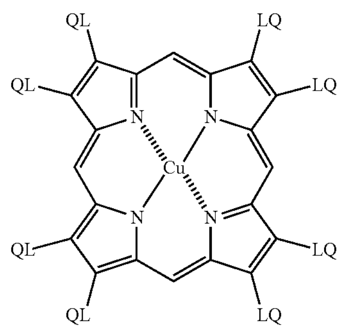
(D8)
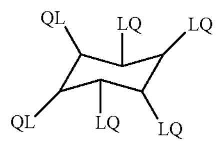
(D9)
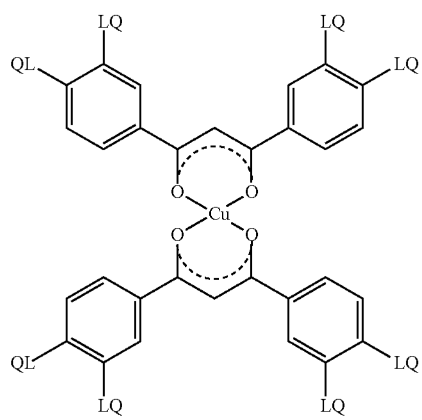
(D10)
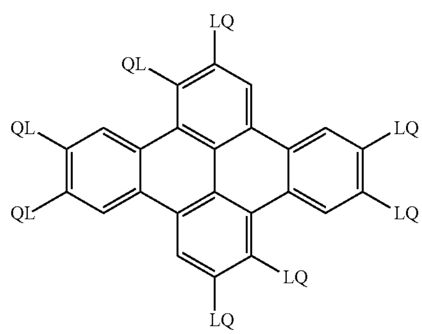
-continued
(D11)
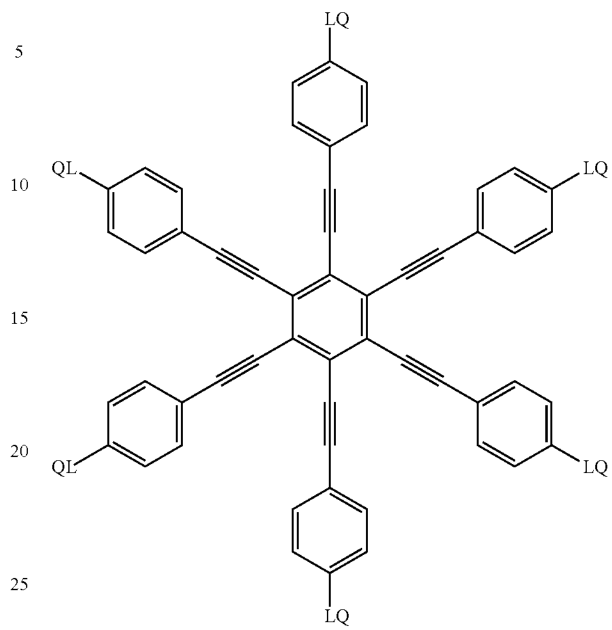
(D12)
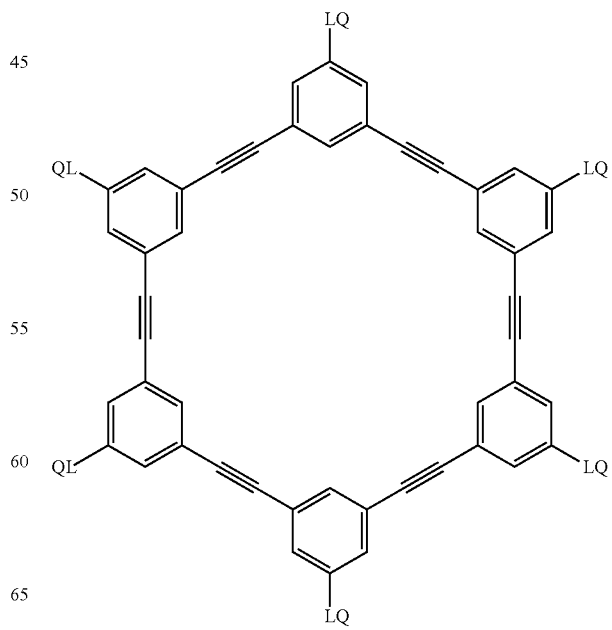

-continued (D13)

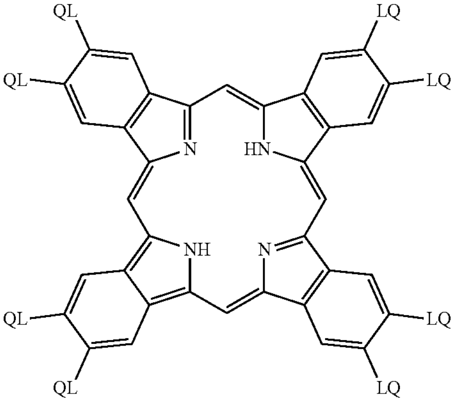

(D14)

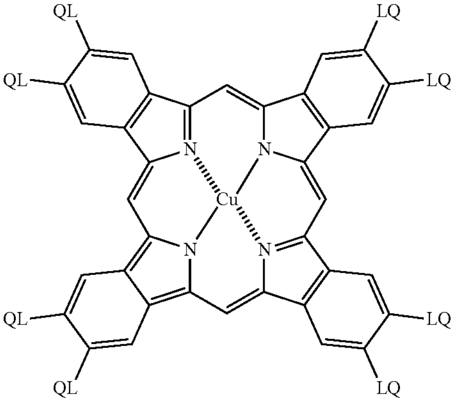

(D15)

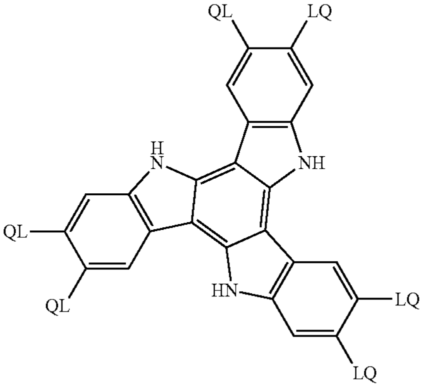

In Formulae (D1) to (D15), L represents a divalent linking group.

From a viewpoint of more excellent thermally conductive properties of the thermally conductive material, L is each independently preferably a group selected from the group consisting of an alkylene group, an alkenylene group, an arylene group, —CO—, —NH—, —O—, —S—, and a combination thereof, and more preferably a group obtained by combining two or more groups selected from the group consisting of an alkylene group, an alkenylene group, an arylene group, —CO—, —NH—, —O—, and —S—.

The number of carbon atoms in the alkylene group is preferably 1 to 12. The number of carbon atoms in the alkenylene group is preferably 2 to 12. The number of carbon atoms in the arylene group is preferably 10 or less.

The alkylene group, the alkenylene group, and the arylene group may have a substituent. Examples of the substituent include an alkyl group, a halogen atom, a cyano group, an alkoxy group, an acyloxy group, and the like.

An example of L is shown below. In the following example, a bonding site on a left side is bonded to a central structure (hereinafter, also simply referred to as "central ring") of the compound represented by any of Formulae (D1) to (D15), and a bonding site on a right side is bonded to Q.

AL means an alkylene group or an alkenylene group, and AR means an arylene group.

L101: -AL-CO—O-AL—
L102: -AL-CO—O-AL-O—
L103: -AL-CO—O-AL-O-AL—
L104: -AL-CO—O-AL-O—CO—
L105: —CO-AR-O-AL-
L106: —CO-AR-O-AL-O—
L107: —CO-AR-O-AL-O—CO—
L108: —CO—NH-AL-
L109: —NH-AL-O—
L110: —NH-AL-O—CO—
L111: —O-AL-
L112: —O-AL-O—
L113: —O-AL-O—CO—
L114: —O-AL-O—CO—NH-AL-
L115: —O-AL-S-AL-
L116: —O—CO-AL-AR-O-AL-O—CO—
L117: —O—CO-AR-O-AL-CO—
L118: —O—CO-AR-O-AL-O—CO—
L119: —O—CO-AR-O-AL-O-AL-O—CO—
L120: —O—CO-AR-O-AL-O-AL-O-AL-O—CO—
L121: —S-AL-
L122: —S-AL-O—
L123: —S-AL-O—CO—
L124: —S-AL-S-AL-
L125: —S-AR-AL-
L126: —O—CO-AL-
L127: —O—CO-AL-O—
L128: —O—CO-AR-O-AL-
L129: —O—CO—
L130: —O—CO-AR-O-AL-O—CO-AL-S-AR-
L131: —O—CO-AL-S-AR-
L132: —O—CO-AR-O-AL-O—CO-AL-S-AL-
L133: —O—CO-AL-S-AR-
L134: —O-AL-S-AR-
L135: -AL-CO—O-AL-O—CO-AL-S-AR-
L136: -AL-CO—O-AL-O—CO-AL-S-AL-
L137: —O-AL-O-AR-
L138: —O-AL-O—CO-AR-
L139: —O-AL-NH-AR-
L140: —O—CO-AL-O-AR-
L141: —O—CO-AR-O-AL-O-AR-
L142: -AL-CO—O-AR-
L143: -AL-CO—O-AL-O-AR-

In Formulae (D1) to (D15), Q's each independently represent a hydrogen atom or a substituent.

Examples of the substituent include groups exemplified in the aforementioned substituent group Y. More specifically, examples of the substituent include a hydroxyl group, a carboxylic acid group, a carboxylic acid anhydride group, an amino group, a cyanate ester group, a thiol group, a halogen atom, an isocyanate group, a cyano group, an unsaturated polymerizable group, an epoxy group, an oxetanyl group, an aziridinyl group, a thioisocyanate group, an aldehyde group, and a sulfo group.

However, in a case where Q is a group other than the epoxy group, Q is preferably stable with respect to the epoxy group.

In Formulae (D1) to (D15), one or more (preferably two or more) Q's represent an epoxy group. Among them, from a viewpoint of more excellent thermally conductive properties of the thermally conductive material, it is more preferable that all Q's represent epoxy groups.

The compounds represented by Formulae (D1) to (D15) preferably do not have —NH— from a viewpoint of the stability of the epoxy group.

Among the compounds represented by Formulae (D1) to (D15), the compound represented by Formula (D4) is preferable from the viewpoint of more excellent thermally conductive properties of the thermally conductive material. In other words, the central ring of the disk-like compound is preferably a triphenylene ring.

As the compound represented by Formula (D4), the compound represented by Formula (XI) is preferable from the viewpoint of more excellent thermally conductive properties of the thermally conductive material.

Formula (XI)

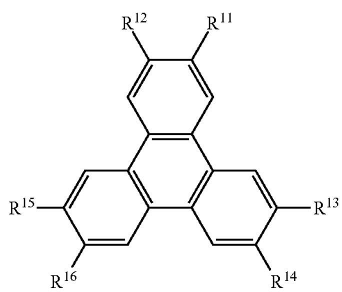

In Formula (XI), $R^{11}$, $R^{12}$, $R^{13}$, $R^{14}$, $R^{15}$, and $R^{16}$ each independently represent *—$X^{11}$-$L^{11}$-$P^{11}$ or *—$X^{12}$-$L^{12}$-$Y^{12}$.

* represents a bonding position with a triphenylene ring.

Among $R^{11}$, $R^{12}$, $R^{13}$, $R^{14}$, $R^{15}$, and $R^{16}$, two or more are *—$X^{11}$L-$P^{11}$, and three or more are preferably *—$X^{11}$-$L^{11}$-$P^{11}$.

Among them, from the viewpoint of more excellent thermally conductive properties of the thermally conductive material, one or more of $R^{11}$ or $R^{12}$, one or more of $R^{13}$ or $R^{14}$, and one or more of $R^{15}$ or $R^{16}$ are preferably *—$X^{11}$-$L^{11}$-$P^{11}$.

It is more preferable that $R^{11}$, $R^{12}$, $R^{13}$, $R^{14}$, $R^{15}$, and $R^{16}$ are all *—$X^{11}$-$L^{11}$-$P^{11}$. In addition, it is more preferable that $R^{11}$, $R^{12}$, $R^{13}$, $R^{14}$, $R^{15}$, and $R^{16}$ are all the same.

$X^{11}$ each independently represents a single bond, —O—, —CO—, —NH—, —O—CO—, —O—CO—O—, —O—CO—NH—, —O—CO—S—, —CO—O—, —CO—NH—, —CO—S—, —NH—CO—, —NH—CO—O—, —NH—CO—NH—, —NH—CO—S—, —S—, —S—CO—, —S—CO—O—, —S—CO—NH—, or —S—CO—S—.

Among them, $X^{11}$ is each independently preferably —O—, —O—CO—, —O—CO—O—, —O—CO—NH—, —CO—O—, —CO—NH—, —NH—CO—, or —NH—CO—O—, more preferably —O—, —O—CO—, —CO—O—, —O—CO—NH—, or —CO—NH—, and even more preferably —O—CO— or —CO—O—.

$L^{11}$ each independently represents a single bond or a divalent linking group.

Examples of the divalent linking group include —O—, —O—CO—, —CO—O—, —S—, —NH—, an alkylene group (the number of carbon atoms is preferably 1 to 10, more preferably 1 to 8, and even more preferably 1 to 7), an arylene group (the number of carbon atoms is preferably 6 to 20, more preferably 6 to 14, and even more preferably 6 to 10), and a group obtained by combining thereof.

Examples of the alkylene group include a methylene group, an ethylene group, a propylene group, a butylene group, a pentylene group, a hexylene group, and a heptylene group.

Examples of the arylene group include a 1,4-phenylene group, a 1,3-phenylene group, a 1,4-naphthylene group, a 1,5-naphthylene group, and an anthracenylene group, and a 1,4-phenylene group is preferable.

The alkylene group and the arylene group may each have a substituent. The number of substituents is preferably 1 to 3, and more preferably 1. The substitution position of the substituent is not particularly limited. As the substituent, a halogen atom or an alkyl group having 1 to 3 carbon atoms is preferable, and a methyl group is more preferable.

It is also preferable that the alkylene group and the arylene group are unsubstituted.

Examples of —$X^{11}$-$L^{11}$- include L101 to L143, which are examples of the aforementioned L.

$P^{11}$ represents an epoxy group. The epoxy group may or may not have a substituent.

$X^{12}$ is synonymous with $X^{11}$ and has the same preferred aspects.

$L^{12}$ is synonymous with $L^{11}$, and the preferred aspect is also the same.

Examples of —$X^{12}$-$L^{12}$- include L101 to L143, which are examples of the aforementioned L.

$Y^{12}$ represents a group in which a hydrogen atom, a linear, branched, or cyclic alkyl group having 1 to 20 carbon atoms, or one or two or more methylene groups in a linear, branched, or cyclic alkyl group having 1 to 20 carbon atoms is substituted with —O—, —S—, —NH—, —N($CH_3$)—, —CO—, —O—CO—, or —CO—O—.

In a case where $Y^{12}$ is a linear, branched, or cyclic alkyl group having 1 to 20 carbon atoms or a group in which one or two or more methylene groups in the linear, branched, or cyclic alkyl group having 1 to 20 carbon atoms are substituted with —O—, —S—, —NH—, —N($CH_3$)—, —CO)—, —OCO—, or —CO—O—, one or more of the hydrogen atoms contained in $Y^{12}$ may be substituted with halogen atoms.

Specific examples of the compound represented by Formula (XI) include a compound in which at least one (preferably three or more) of terminal ends is an epoxy group in the compound described in paragraphs 0028 to 0036 of JP1995-281028A (JP-H7-281028A), JP1995-306317A (JP-H7-306317A), paragraphs 0016 to 0018 of JP2005-156822A, paragraphs 0067 to 0072 of JP2006-301614A, and pages 330 to 333 of Handbook of Liquid Crystals (published by Maruzen Co., Ltd., 2000).

The compound represented by Formula (XI) can be synthesized in accordance with the methods described in JP1995-306317A (JP-H7-306317A), JP1995-281028A (JP-H7-281028A), JP2005-156822A, and JP2006-301614A.

In addition, from the viewpoint of more excellent thermally conductive properties of the thermally conductive material, the compound represented by Formula (D16) is also preferable as the disk-like compound.

(D16)

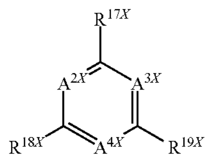

In Formula (D16), $A^{2X}$, $A^{3X}$, and $A^{4X}$ each independently represent —CH═ or —N═. Among them, $A^{2X}$, $A^{3X}$, and $A^{4X}$ each independently preferably represent —CH═.

$R^{17X}$, $R^{18X}$, and $R^{19X}$ each independently represent $*—X^{211X}—(Z^{21X}—X^{212X})_{n21x}-L^{21X}-Q$. * represents a bonding position with a central ring.

$X^{211X}$ and $X^{212X}$ each independently represent a single bond, —O—, —CO—, —NH—, —O—CO—, —O—CO—O—, —O—CO—NH—, —O—CO—S—, —CO—O—, —CO—NH—, —CO—S—, —NH—CO—, —NH—CO—O—, —NH—CO—NH—, —NH—CO—S—, —S—, —S—CO—, —S—CO—O—, —S—CO—NH—, or —S—CO—S—.

$Z^{21X}$'s each independently represent a 5-membered or 6-membered aromatic ring group or a 5-membered or 6-membered non-aromatic ring group.

$L^{21X}$ represents a single bond or a divalent linking group.

Q is synonymous with Q in Formulae (D1) to (D15), and the preferred aspect is also the same. In Formula (D16), at least one Q among a plurality of Q's represents an epoxy group.

n21X represents an integer of 0 to 3. In a case where n21X is 2 or greater, a plurality of $(Z^{21X}—X^{212X})$ may be the same as or different from each other.

However, the compound represented by Formula (D16) preferably does not have —NH— from the viewpoint of the stability of the epoxy group.

As the compound represented by Formula (D16), a compound represented by Formula (XII) is preferable.

(XII)

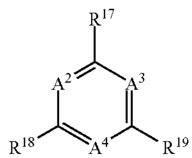

In Formula (XII), $A^2$, $A^3$, and $A^4$ each independently represent —CH═ or —N═. Among them, $A^2$, $A^3$, and $A^4$ are preferably —CH═. In other words, it is also preferable that the central ring of the disk-like compound is a benzene ring.

$R^{17}$, $R^{18}$, and $R^{19}$ each independently represent $*—X^{211}—(Z^{21}—X^{212})_{n21}-L^{21}-P^{21}$ or $*—X^{221}—(Z^{22}—X^{222})_{n22}—Y^{22}$. * represents a bonding position with the central ring.

Two or more of $R^{17}$, $R^{18}$, and $R^{19}$ are $*—X^{211}—(Z^{21}—X^{212})_{n21}-L^{21}-P^{21}$. From the viewpoint of more excellent thermally conductive properties of the thermally conductive material, it is preferable that all of $R^{17}$, $R^{18}$, and $R^{19}$ are $*—X^{211}—(Z^{21}—X^{212})_{n21}-L^{21}-P^{21}$.

In addition, it is more preferable that $R^{17}$, $R^{18}$, and $R^{19}$ are all the same.

$X^{211}$, $X^{212}$, $X^{221}$, and $X^{222}$ each independently represent a single bond, —O—, —CO—, —NH—, —O—CO—, —O—CO—O—, —O—CO—NH—, —O—CO—S—, —CO—O—, —CO—NH—, —CO—S—, —NH—CO—, —NH—CO—O—, —NH—CO—NH—, —NH—CO—S—, —S—, —S—CO—, —S—CO—O—, —S—CO—NH—, or —S—CO—S—.

Among them, $X^{211}$, $X^{212}$, $X^{221}$, and $X^{222}$ are each independently preferably a single bond, —O—, —CO—O—, or —O—CO—.

$Z^{21}$ and $Z^{22}$ each independently represent a 5-membered or 6-membered aromatic ring group or a 5-membered or 6-membered non-aromatic ring group. More specific examples of $Z^{21}$ and $Z^{22}$ include 1,4-phenylene group, 1,3-phenylene group, and aromatic heterocyclic group.

The aromatic ring group and the non-aromatic ring group may have a substituent. The number of substituents is preferably 1 or 2, and more preferably 1. The substitution position of the substituent is not particularly limited. As the substituent, a halogen atom or a methyl group is preferable. It is also preferable that the aromatic ring group and the non-aromatic ring group are unsubstituted.

Examples of the aromatic heterocyclic group include the following aromatic heterocyclic groups.

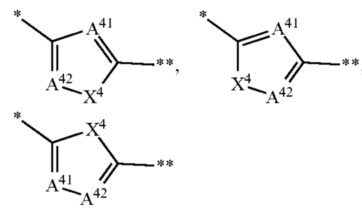

In the formula, * represents a site that is bonded to $X^{211}$ or $X^{221}$. ** represents a site that is bonded to $X^{212}$ or $X^{222}$. $A^{41}$ and $A^{42}$ each independently represent a methine group or a nitrogen atom. $X^4$ represents an oxygen atom, a sulfur atom, or an imino group.

Preferably at least one of $A^{41}$ or $A^{42}$ is a nitrogen atom, and more preferably both of $A^{41}$ and $A^{42}$ are nitrogen atoms. In addition, $X^4$ is preferably an oxygen atom.

In a case where n21 and n22 to be described later are two or greater, a plurality of $(Z^{21}—X^{212})$ and $(Z^{22}—X^{222})$ may be the same as or different from each other.

$L^{21}$ each independently represents a single bond or a divalent linking group, and is synonymous with $L^{11}$ in the aforementioned Formula (XI). $L^{21}$ is preferably —O—, —O—CO—, —CO—O—, —S—, —NH—, an alkylene group (the number of carbon atoms is preferably 1 to 10, more preferably 1 to 8, and even more preferably 1 to 7), an arylene group (the number of carbon atoms is preferably 6 to 20, more preferably 6 to 14, and even more preferably 6 to 10), or a group obtained by combining these.

In a case where n22 to be described later is 1 or greater, examples of $—X^{212}-L^{21}-$similarly include L101 to L143, which are examples of L in the aforementioned Formulae (D1) to (D15).

$P^{21}$ represents an epoxy group. The epoxy group may or may not have a substituent.

$Y^{22}$ each independently represents a hydrogen atom, a linear, branched, or cyclic alkyl group having 1 to 20 carbon atoms, or a group in which one or two or more methylene groups in a linear, branched, or cyclic alkyl group having 1 to 20 carbon atoms are substituted with —O—, —S—, —NH—, —N($CH_3$)—, —CO—, —O—CO—, or —CO—O—, and is synonymous with $Y^{12}$ in General Formula (XI), and the preferred range is also the same.

n21 and n22 each independently represent an integer of 0 to 3, and from the viewpoint of more excellent thermally conductive properties, are preferably an integer of 1 to 3, and more preferably an integer of 2 or 3.
Preferred examples of the disk-like compound include the following compounds.
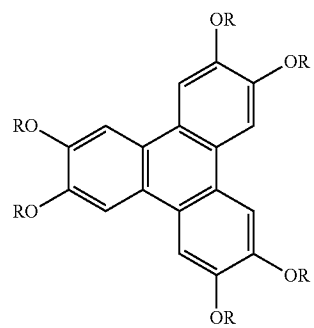
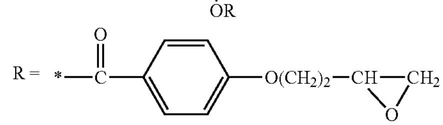
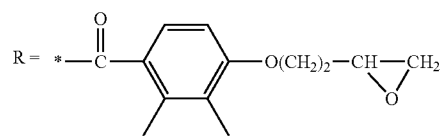
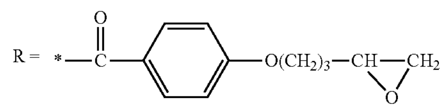
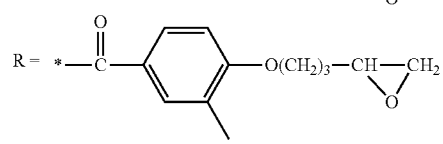
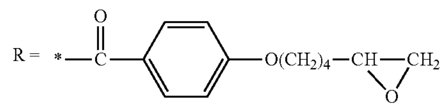
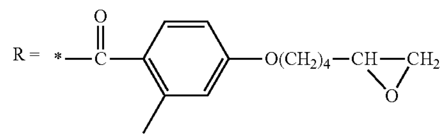
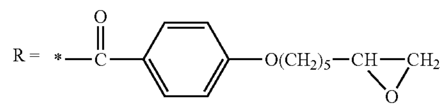
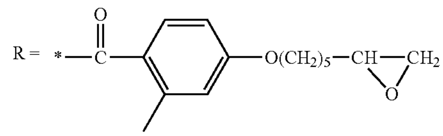
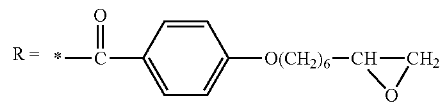
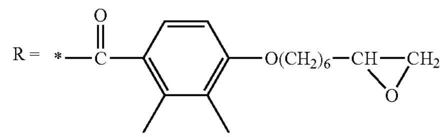
-continued
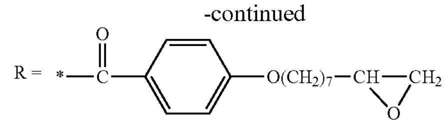
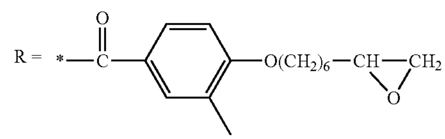
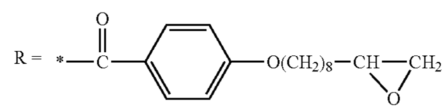
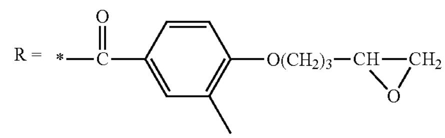
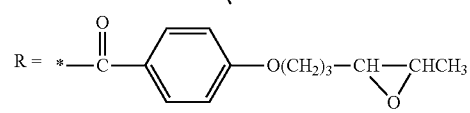
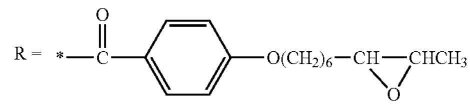
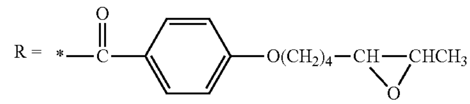
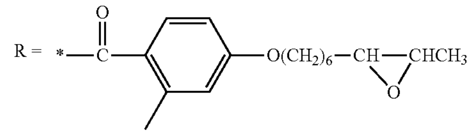
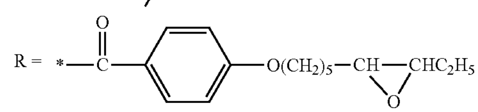
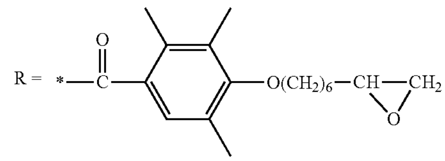
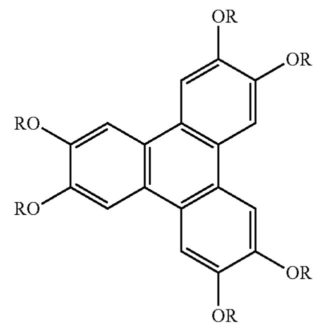
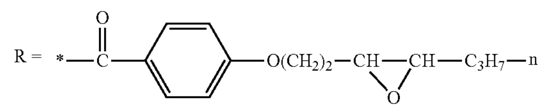
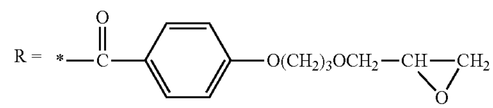

-continued
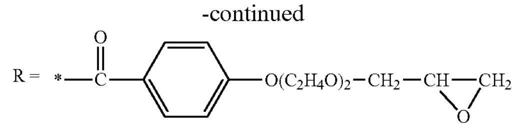
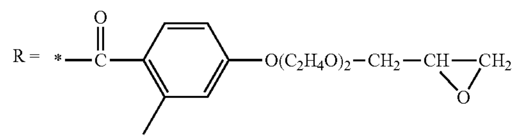
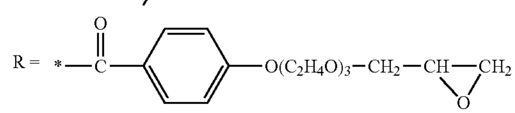
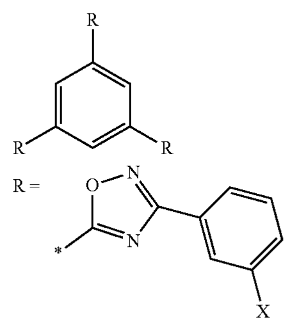
X =
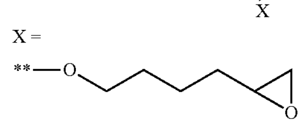
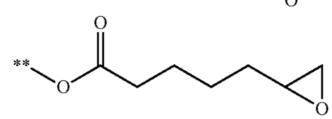
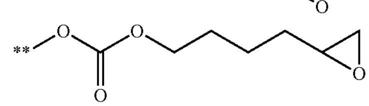
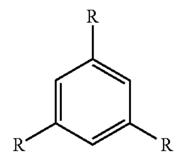
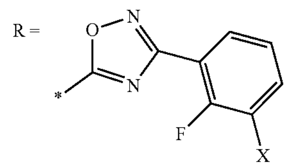
X =
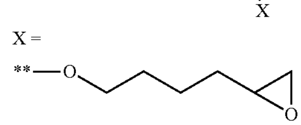
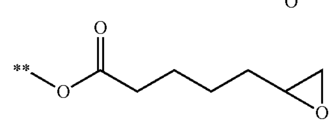
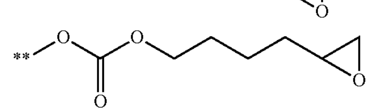
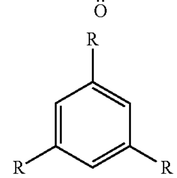
-continued
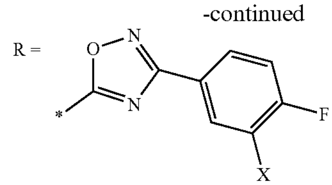
X =
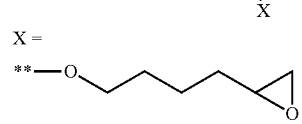
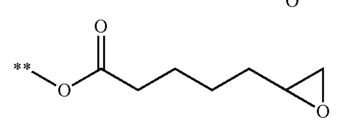
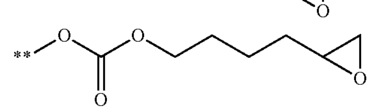
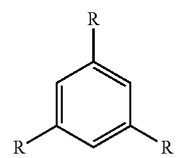
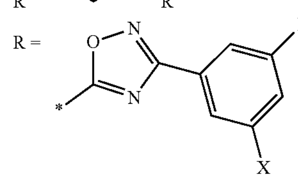
X =
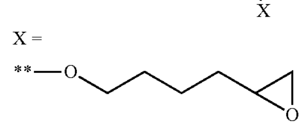
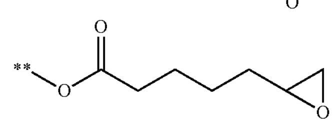
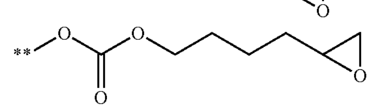
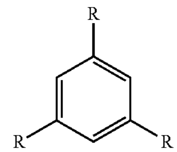
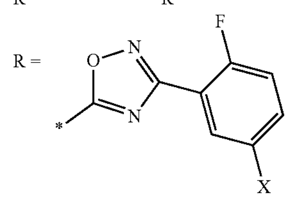
X =
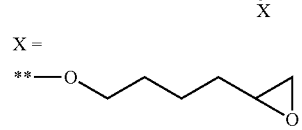
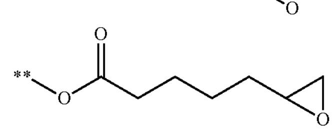
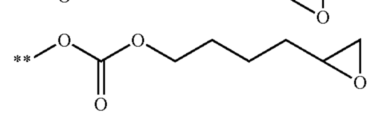

-continued
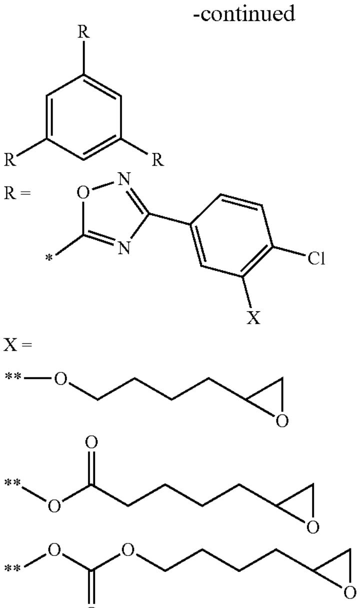
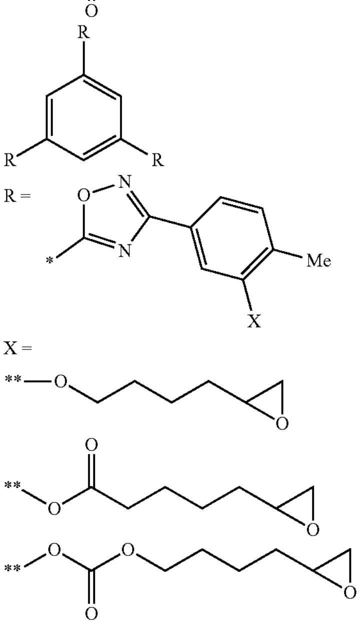
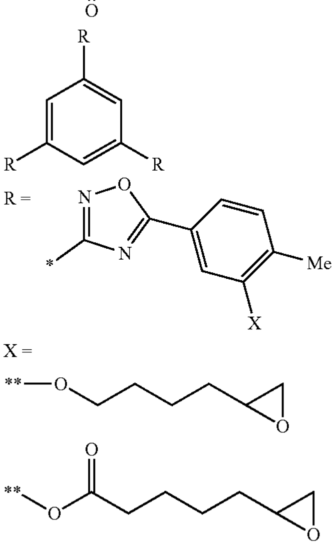
-continued
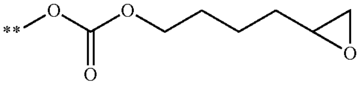
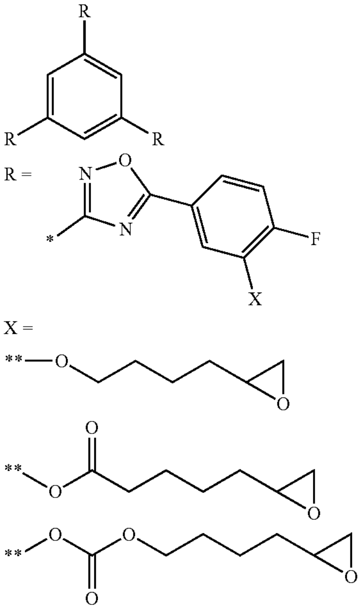
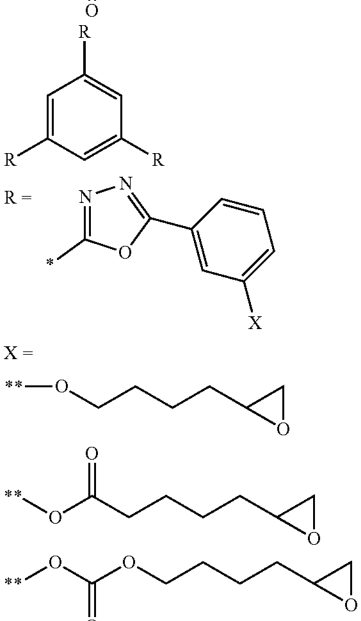
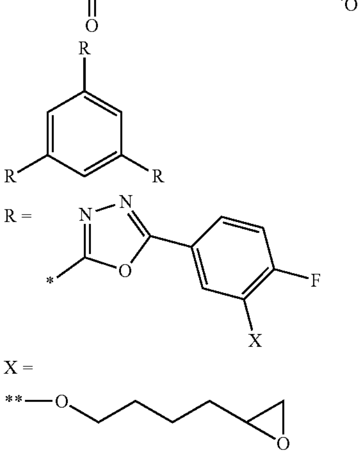

-continued
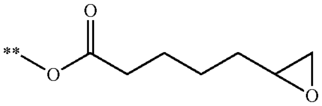
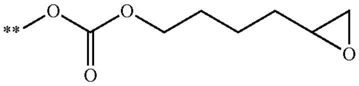
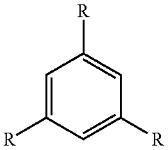
R =
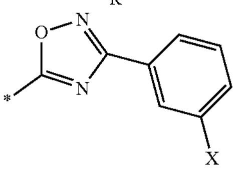
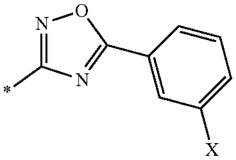
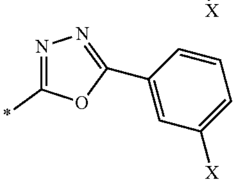
X =
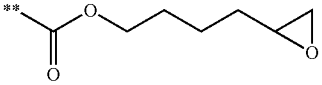
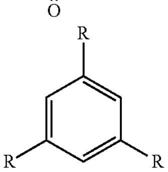
R =
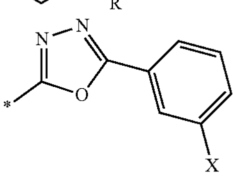
X =
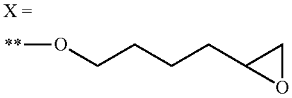
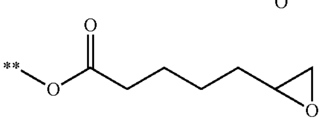
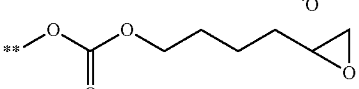
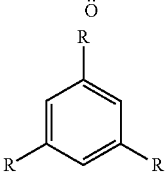
-continued
R =
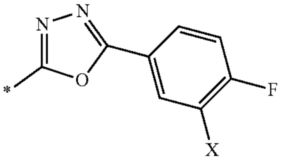
X =
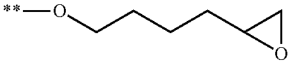
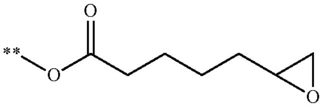
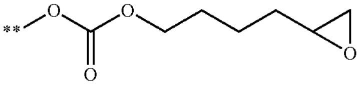
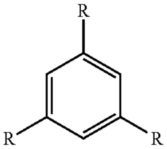
R =
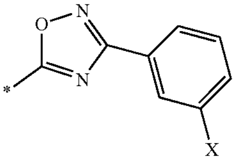
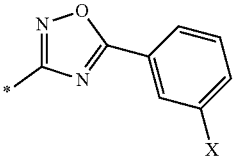
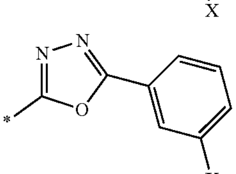
X =
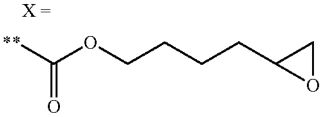
In the following structural formula, R represents $—X^{212}-L^{21}-P^{21}$.

-continued
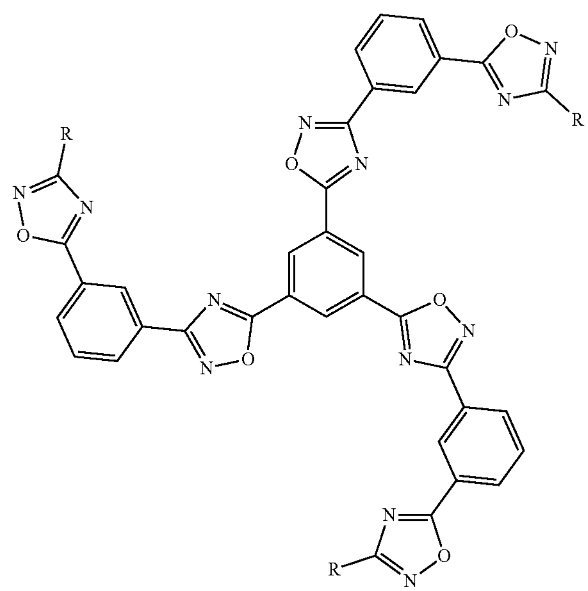
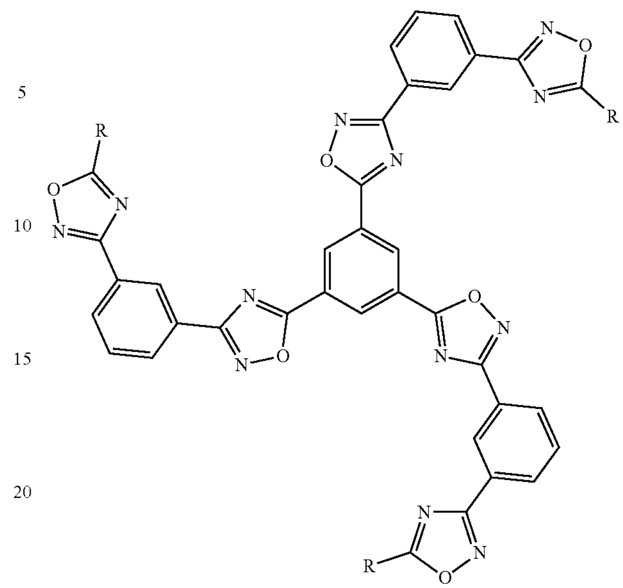
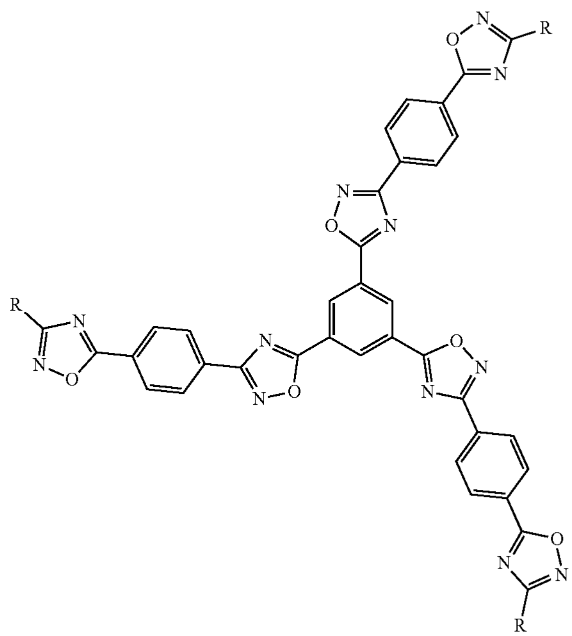
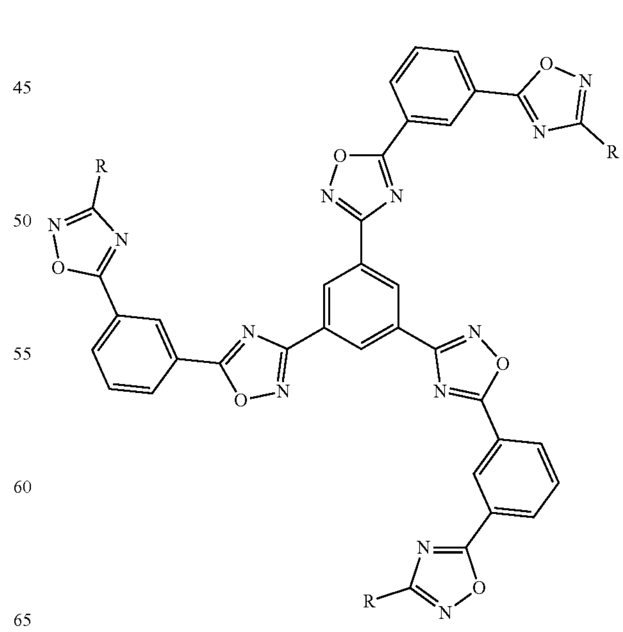

-continued

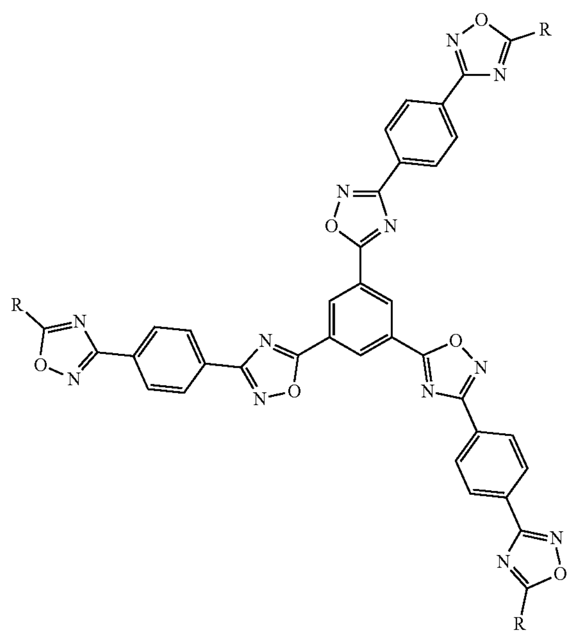

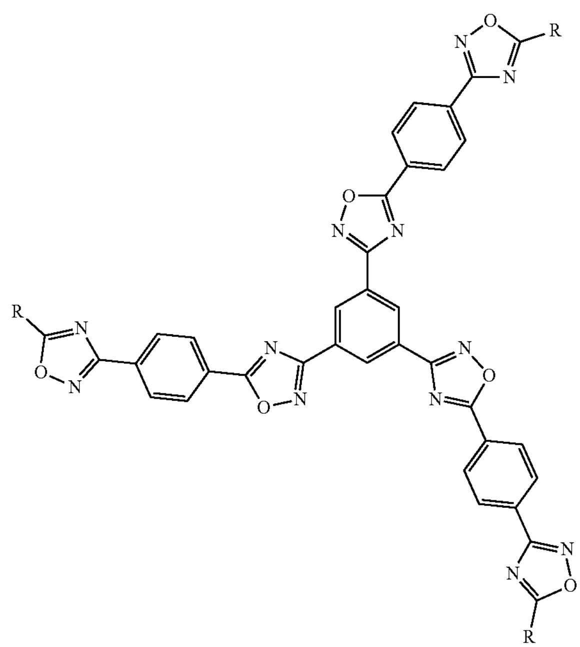

-continued

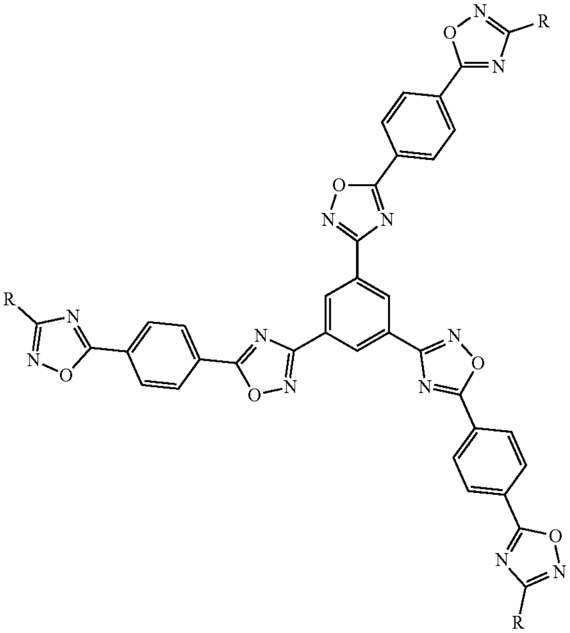

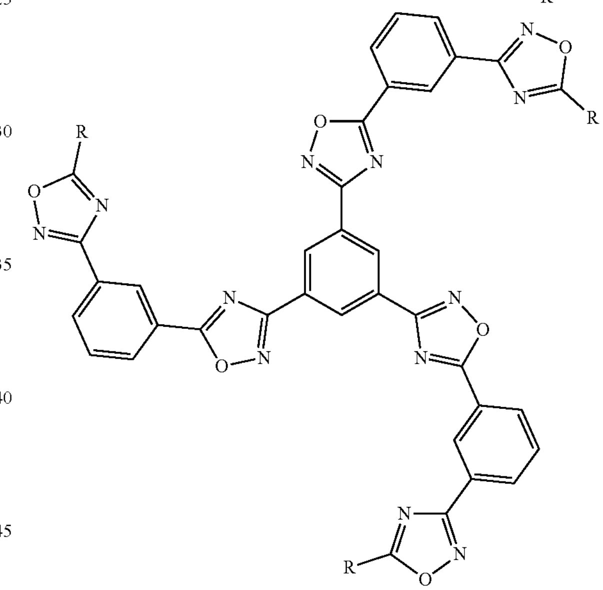

For details and specific examples of the compound represented by Formula (XII), a compound in which at least one (preferably three or more) of terminal ends in the compounds described in paragraphs 0013 to 0077 of JP2010-244038A is an epoxy group can be referred to, and the content is incorporated in the present specification.

The compound represented by Formula (XII) can be synthesized in accordance with the methods described in JP2010-244038A, JP2006-076992A, and JP2007-002220A.

The disk-like compound is preferably a compound having a hydrogen-bonding functional group from a viewpoint of reducing the electron density, strengthening the stacking, and facilitating the formation of a columnar aggregate. Examples of the hydrogen-bonding functional group include —O—CO—NH—, —CO—NH—, —NH—CO—, —NH—CO—O—, —NH—CO—NH—, —NH—CO—S—, or —S—CO—NH—.

(Other Epoxy Compounds)

Examples of other epoxy compounds other than the aforementioned epoxy compound include an epoxy compound represented by General Formula (DN).

(DN)

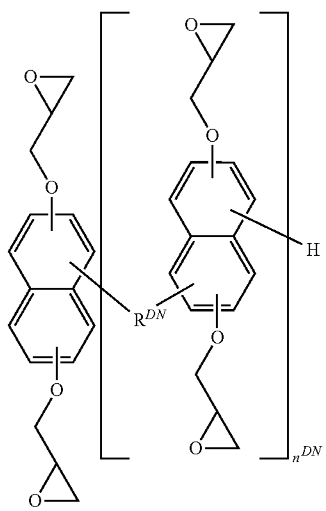

In General Formula (DN), $n^{DN}$ represents an integer of 0 or greater, is preferably an integer of 0 to 5, and is more preferably 1.

$R^{DN}$ represents a single bond or a divalent linking group. The divalent linking group is preferably —O—, —O—CO—, —CO—O—, —S—, an alkylene group (the number of carbon atoms is preferably 1 to 10), an arylene group (the number of carbon atoms is preferably 6 to 20), or a group obtained by combining these groups, more preferably an alkylene group, and even more preferably a methylene group.

Examples of other epoxy compounds include compounds in which the epoxy group is fused. Examples of such a compound include 3,4:8,9-diepoxybicyclo [4.3.0]nonane.

Examples of the other epoxy compounds include, in addition to the aforementioned epoxy compounds, a bisphenol A-type epoxy compound, a bisphenol F-type epoxy compound, a bisphenol S-type epoxy compound, a bisphenol AD-type epoxy compound, and the like, which are glycidyl ethers of bisphenol A, F, S, and AD, and the like; a hydrogenated bisphenol A-type epoxy compound, a hydrogenated bisphenol AD-type epoxy compound, and the like; a phenol novolac-type glycidyl ether (phenol novolac-type epoxy compound), a cresol novolac-type glycidyl ether (cresol novolac-type epoxy compound), a bisphenol A novolac-type glycidyl ether, and the like; a dicyclopentadiene-type glycidyl ether (dicyclopentadiene-type epoxy compound); a dihydroxypentadiene-type glycidyl ether (dihydroxypentadiene-type epoxy compound); a polyhydroxybenzene-type glycidyl ether (polyhydroxybenzene-type epoxy compound); a benzene polycarboxylic acid-type glycidyl ester (benzene polycarboxylic acid-type epoxy compound); and a trisphenol methane-type epoxy compound.

One kind of the epoxy compounds may be used singly, or two or more kinds thereof may be used.

A ratio of the number of epoxy groups contained in the epoxy compound to the number of phenolic hydroxyl groups contained in the phenolic compound in the composition (number of epoxy groups/number of phenolic hydroxyl groups) is 40/60 to 60/40, and preferably 45/55 to 55/45.

That is, A ratio of the content of the epoxy compound to the phenolic compound in the composition is preferably such that the aforementioned "number of phenolic hydroxyl groups/number of epoxy groups" is within the above range.

In addition, in the composition, an equivalent ratio (number of epoxy group/number of active hydrogen) between the epoxy group of the epoxy compound and the active hydrogen (may be active hydrogen derived from a phenolic hydroxyl group, or may be active hydrogen of another active hydrogen-containing compound) is preferably 30/70 to 70/30, more preferably 40/60 to 60/40, and even more preferably 45/55 to 55/45.

In addition, in the composition, a total content of the epoxy compound and the phenolic compound is preferably 5% to 90% by mass, more preferably 10% to 50% by mass, and even more preferably 15% to 40% by mass with respect to the total solid content of the composition.

[Specific Compound]

The composition according to the embodiment of the present invention contains a specific compound represented by Formula (1).

The specific compound functions as a curing accelerator when a curing treatment is performed using the composition.

(1)

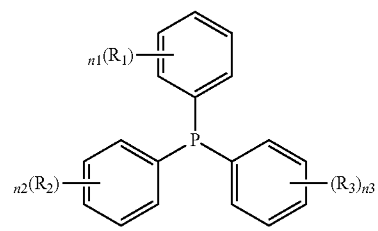

In Formula (1), $R_1$ to $R_3$ each independently represent a substituent. n1 to n3 each independently represents an integer of 0 to 5. The sum of n1 to n3 is an integer of 1 to 15.

That is, at least one of the three benzene rings in Formula (1) has at least one substituent.

In addition, in a case where n1 is an integer of 2 to 5, 2 to 5 $R_1$ may be the same as or different from each other. In a case where n2 is an integer of 2 to 5, 2 to 5 $R_2$ may be the same as or different from each other. In a case where n3 is an integer of 2 to 5, 2 to 5 $R_3$ may be the same as or different from each other.

n1 to n3 are each independently preferably an integer of 0 to 2, and from a viewpoint of more excellent handleability in a semi-cured state, 1 or 2 is more preferable, and 1 is even more preferable.

From a viewpoint of handleability in a semi-cured state, the sum of n1 to n3 is preferably 2 to 6, more preferably 3 to 6, and even more preferably 3.

The substitution position of the substituents represented by $R_1$ to $R_3$ is not particularly limited, but is preferably substituted at the ortho-position or the para-position with respect to the bonding position of the phosphorus atom in the benzene ring in Formula (1).

Among them, from a viewpoint of more excellent handleability in a semi-cured state, it is preferable that at least one of the substituents represented by $R_1$ to $R_3$ is substituted with the ortho-position with respect to the bonding position of the phosphorus atom in the benzene ring in Formula (1), and it is more preferable that each of the three benzene rings has at least one substituent substituted at the ortho-position with respect to the bonding position of the phosphorus atom.

Examples of the specific compound that has at least one of the substituents in which each of the three benzene rings in Formula (1) is substituted at the ortho-position with respect to the bonding position of the phosphorus atom include a compound represented by Formula (2).

(2)

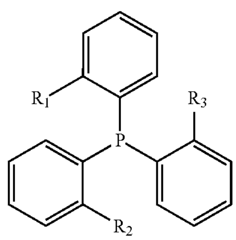

In Formula (2), $R_1$ to $R_3$ each independently represent a substituent.

Examples of the substituents represented by $R_1$ to $R_3$ include the groups exemplified by the above substituent group Y, and more specifically, a halogen atom (fluorine atom, chlorine atom, bromine atom, and the like), an alkyl group, an alkoxy group, an acyl group, an alkoxycarbonyl group, an acyloxy group, a cyano group, a nitro group, and the like.

These groups may further have a substituent. Examples of the substituent that the substituents represented by $R_1$ to $R_3$ may have include a halogen atom.

The alkyl group represented by $R_1$ to $R_3$ may be linear or branched. The number of carbon atoms in the alkyl group is preferably 1 to 6, and more preferably 1 to 4. Examples of the alkyl group having 1 to 6 carbon atoms include a methyl group, an ethyl group, an n-propyl group, an isopropyl group, an n-butyl group, a sec-butyl group, a tert-butyl group.

In addition, the alkyl group represented by $R_1$ to $R_3$ preferably has a halogen atom such as a fluorine atom or does not have a substituent, and more preferably does not have a substituent.

The alkyl group moieties contained in each of the alkoxy group, the acyl group, the alkoxycarbonyl group, and the acyloxy group represented by $R_1$ to $R_3$ are the same as the matters described based on the alkyl group, including preferred embodiments thereof.

As the substituent represented by $R_1$ to $R_3$, an alkyl group which may have a halogen atom or an alkoxy group which may have a halogen atom is preferable, and from a viewpoint of more excellent thermally conductive properties of the thermally conductive material and withstand voltage, the alkyl group having no substituent or the alkoxy group having no substituent is more preferable, an alkyl group having 1 to 6 carbon atoms having no substituent is even more preferable, and an alkyl group having 1 to 4 carbon atoms having no substituent is particularly preferable.

As a substituent represented by $R_1$ to $R_3$, the specific compound preferably has at least one of the above preferred groups, more preferably has at least two of the above preferred groups, and even more preferably the one in which at least one of the preferred groups is substituted with each of the three benzene rings.

A molecular weight of the specific compound is not particularly limited, but is preferably 500 or less, more preferably 420 or less, and even more preferably 360 or less. A lower limit of the molecular weight of the specific compound is not particularly limited, but is preferably 270 or greater.

Examples of the specific compound include triphenylphosphine in which each benzene ring has at least one of substituents represented by $R_1$ to $R_3$, such as tris(C1 to C4 alkylphenyl)phosphine, tris(C1 to C4 alkoxyphenyl)phosphine, tris(bis(C1 to C4 alkyl)phenyl)phosphine, tris(trifluoromethylphenyl)phosphine, and tris(fluorophenyl) phosphine; triphenylphosphine having any two substituents represented by $R_1$ to $R_3$, such as bis(C1 to C4 alkylphenyl) phenylphosphine, bis(C1 to C4 alkoxyphenyl)phenylphosphine, bis(bis(C1 to C4 alkyl)phenyl)phenylphosphine, bis (trifluoromethylphenyl)phenylphosphine, and bis (fluorophenyl)phenylphosphine; and triphenylphosphine having one substituent represented by $R_1$ to $R_3$, such as diphenyl(C1 to C4 alkylphenyl)phosphine, diphenyl(C1 to C4 alkoxyphenyl)phosphine, diphenyl(bis(C1 to C4 alkoxy) phenyl)phosphine, diphenyl(trifluoromethylphenyl)phosphine, and diphenyl(fluorophenyl)phosphine.

Among them, from a viewpoint of more excellent handleability in a semi-cured state, tris(o-(C1 to C4 alkyl)phenyl) phosphine, tris(o-methoxyphenyl)phosphine, tris(o-, m-, or p-trifluoromethylphenyl)phosphine, bis(o-(C1 to C4 alkyl)) phenylphosphine, or bis(o-methoxyphenyl)phenylphosphine is preferable, and tris(o-(C1 to C4 alkyl)phenyl) phosphine or tris(p-trifluoromethylphenyl)phosphine is more preferable.

In addition, from the viewpoint of more excellent thermally conductive properties of the cured product, tris(o-, m-, or p- (C1 to C4 alkyl)phenyl)phosphine, tris(o-, m-, or p-(C1 to C4 alkoxy)phenyl)phosphine, bis(o-, m-, or p-(C1 to C4 alkyl)phenyl)phenylphosphine, or bis(o-, m-, or p-(C1 to C4 alkoxy)phenyl)phenylphosphine are more preferable.

One kind of the specific compounds in the composition may be used singly, or two or more kinds thereof may be used in combination.

A content of the specific compound in the composition is preferably 0.01% to 10% by mass, more preferably 0.1% to 5% by mass, and even more preferably 0.2% to 2% by mass, with respect to the total solid content of the composition.

[Inorganic Nitride]

The composition according to the embodiment of the present invention contains an inorganic nitride.

Examples of the inorganic nitride include boron nitride (BN), carbon nitride ($C_3N_4$), silicon nitride ($Si_3N_4$), gallium nitride (GaN), indium nitride (InN), aluminum nitride (AlN), chromium nitride ($Cr_2N$), copper nitride ($Cu_3N$), iron nitride ($Fe_4N$ or $Fe_3N$), lanthanum nitride (LaN), lithium nitride ($Li_3N$), magnesium nitride ($Mg_3N_2$), molybdenum nitride ($Mo_2N$), niobium nitride (NbN), tantalum nitride (TaN), titanium nitride (TiN), tungsten nitride ($W_2N$, $WN_2$, or WN) yttrium nitride (YN), and zirconium nitride (ZrN).

The above inorganic nitride may be used singly or used in combination in plurality.

From a viewpoint of more excellent thermally conductive properties, the inorganic nitride preferably contains at least one selected from the group consisting of a boron atom, an aluminum atom, and a silicon atom. More specifically, the inorganic nitride is preferably boron nitride, aluminum nitride, or silicon nitride, more preferably boron nitride or aluminum nitride, and even more preferably boron nitride.

The shape of the inorganic nitride is not particularly limited, and examples thereof include a particle shape, a film shape, and a plate shape, and the particle shape is preferable. When the inorganic nitride has the particle shape, examples of the shape thereof include a rice grain shape, a spherical shape, a cubical shape, a spindle shape, a scale shape, an aggregate shape, and an amorphous shape, the scale shape or the aggregate shape is preferable, and the aggregate shape is more preferable.

Aggregated particles are particles (aggregates) formed by aggregating primary particles. The shape of the aggregate is not limited, but a spherical or amorphous shape is preferable.

A size of the inorganic nitride is not particularly limited, but from a viewpoint of more excellent dispersibility of a surface-modified inorganic nitride, an average particle diameter of the inorganic nitride is preferably 500 μm or less, more preferably 300 μm or less, and even more preferably 150 μm or less. A lower limit of the average particle diameter of the inorganic nitride is not particularly limited, but from a viewpoint of handleability, 10 nm or greater is preferable, 100 nm or greater is more preferable, 2 m or greater is even more preferable, and 20 μm or greater is particularly preferable.

As a method of measuring the above average particle diameter, the average particle diameter is obtained by randomly selecting 100 pieces of inorganic nitride using an electron microscope, measuring the particle diameters (long diameter) of the respective inorganic nitride, and determining the arithmetic mean thereof. In a case of using a commercially available product, the catalog value may be used.

As the inorganic nitride, aggregated inorganic nitride particles having an average particle diameter of 20 m or greater are preferable, and aggregated boron nitride particles having an average particle diameter of 20 to 150 μm are more preferable.

A content of the inorganic nitride in the composition is preferably 10% to 95% by mass, more preferably 20% to 90% by mass, and even more preferably 40% to 85% by mass, with respect to the total solid content of the composition.

In addition, the composition may contain an inorganic substance other than the inorganic nitride ("other inorganic substances" described later).

In a case where the composition contains other inorganic substances, the total content of "inorganic nitride" and "other inorganic substances" (hereinafter, both are collectively referred to as "inorganic substances") is preferably 15% to 95% by mass, more preferably 40% to 90% by mass, and even more preferably 60% to 85% by mass with respect to the total solid content of the composition.

In addition, in a case where the composition does not contain other inorganic substances, the content of the inorganic nitride is preferably 10% to 95% by mass, more preferably 50% to 90% by mass, and even more preferably 60% to 85% by mass, with respect to the total solid content of the composition.

In a case where the content of the inorganic substances is within the above range, the thermally conductive properties of the obtained thermally conductive material is more excellent.

In a case where the composition contains other inorganic substances, the content of the inorganic nitride with respect to the entire inorganic substances is preferably 10% by mass or greater, more preferably 30% to 90% by mass, and even more preferably 40% to 75% by mass.

From the viewpoint of more excellent thermally conductive properties of the thermally conductive material, the present composition preferably contains inorganic nitride particles having an average particle diameter of 20 μm or greater, more preferably contains aggregated inorganic nitride particles having an average particle diameter of 20 μm or greater, and even more preferably contains aggregated boron nitride particles having an average particle diameter of 20 to 150 μm.

It is also preferable that the inorganic substances contained in the composition are substantially only inorganic substances having an average particle diameter of 20 μm or greater (preferably inorganic nitride, more preferably boron nitride). The fact that the inorganic substances are substantially only inorganic substances having an average particle diameter of 20 μm or greater means that the content of the inorganic substances having an average particle diameter of 20 m or greater is more than 99% by mass with respect to the total mass of the inorganic substances.

In addition, the inorganic substances preferably include inorganic substances having different average particle diameters, for example, it is also preferable that the inorganic substances include both an inorganic substance X which is an inorganic substance having an average particle diameter of 20 μm or greater and an inorganic substance Y which is an inorganic substance having an average particle diameter of less than 20 m.

The average particle diameter of the inorganic substance X is preferably 20 to 300 μm, and more preferably 30 to 200 m. The average particle diameter of the inorganic substance Y is preferably 10 nm or greater and less than 20 μm, and more preferably 100 nm or greater and 15 m or less.

The inorganic substance X is preferably an inorganic nitride or an inorganic oxide, more preferably an inorganic nitride, and even more preferably boron nitride.

The inorganic substance Y is preferably an inorganic nitride or an inorganic oxide, and more preferably boron nitride or aluminum oxide.

One kind of the inorganic substance X and the inorganic substance Y may be used singly, or two or more kinds thereof may be used.

A mass ratio of the content of the inorganic substance X to the content of the inorganic substance Y (content of the inorganic substance X/content of the inorganic substance Y) in the inorganic substance is preferably 50/50 to 99/1, and even more preferably 60/40 to 90/10.

<Other Inorganic Substances>

The present composition may contain other inorganic substances other than the inorganic nitride.

As the other inorganic substances, from a viewpoint of more excellent thermally conductive properties and insulating properties of the thermally conductive material, inorganic oxide is preferable.

Examples of the inorganic oxide include zirconium oxide ($ZrO_2$), titanium oxide ($TiO_2$), silicon oxide ($SiO_2$), aluminum oxide ($Al_2O_3$), iron oxide ($Fe_2O_3$, FeO, or $Fe_3O_4$), copper oxide (CuO or $Cu_2O$), zinc oxide (ZnO), yttrium oxide ($Y_2O_3$), niobium oxide ($Nb_2O_5$), molybdenum oxide ($MoO_3$), indium oxide ($In_2O_3$ or $In_2O$), tin oxide ($SnO_2$), tantalum oxide ($Ta_2O_5$), tungsten oxide ($WO_3$ or $W_2O_5$), lead oxide (PbO or $PbO_2$), bismuth oxide ($Bi_2O_3$), cerium oxide ($CeO_2$ or $Ce_2O_3$), antimony oxide ($Sb_2O_3$ or $Sb_2O_5$), germanium oxide ($GeO_2$ or GeO), lanthanum oxide ($La_2O_3$), and ruthenium oxide ($RuO_2$).

One kind of the inorganic oxides may be used singly, or two or more kinds thereof may be used in combination.

The inorganic oxide is preferably titanium oxide, aluminum oxide, or zinc oxide, and more preferably aluminum oxide.

The inorganic oxide may be an oxide which is produced by oxidizing a metal prepared as a nonoxide in an environment or the like.

The shape of the other inorganic substances is not particularly limited, and examples thereof include particle shape, film shape, and plate shape, and the particle shape is preferable. In a case where the other inorganic substances have the particle shape, examples of the shape thereof include a rice grain shape, a spherical shape, a cubical shape, a spindle shape, a scale shape, an aggregate shape, and an amorphous shape.

A size of the other inorganic substances is not particularly limited, but from a viewpoint of more excellent dispersibility of the other inorganic substances, an average particle diameter of the other inorganic substances is preferably 500 m or less, more preferably 300 μm or less, and even more preferably 200 μm or less. A lower limit is not particularly limited, but is preferably 10 nm or greater and more preferably 100 nm or greater, from the viewpoint of handleability.

For the average particle diameter of the other inorganic substances, in a case where a commercially available product is used, the catalog value is adopted. In a case where there is no catalog value, as the method of measuring the above average particle diameter, the average particle diameter is obtained by randomly selecting 100 pieces of inorganic substances using an electron microscope, measuring particle diameters (long diameter) of the respective inorganic substances, and determining the arithmetic mean thereof.

One kind of the other inorganic substances may be used singly, or two or more kinds thereof may be used in combination. In a case where two or more kinds thereof are used, it is also preferable to use two or more kinds of the other inorganic substances having different average particle diameters in combination. For example, it is also preferable to use both other inorganic substances having an average particle diameter of 1 to 200 μm and other inorganic substances having an average particle diameter of 100 nm or more and less than 1 μm.

In a case where the composition contains the other inorganic substances, the content of the other inorganic substances in the composition is preferably 5% to 90% by mass, more preferably 10% to 60% by mass, and even more preferably 20% to 45% by mass, with respect to the total solid content of the composition.

[Optional Component]

The present composition may contain optional components other than phenolic compounds, epoxy compounds, specific compounds, and inorganic nitrides. Examples of the optional component include the above other inorganic substances, surface modifiers, curing accelerators other than specific compounds (hereinafter, also referred to as "other curing accelerators"), dispersants, and solvents.

Hereinafter, optional components that may be contained in the composition will be described in detail.

<Surface Modifier>

The present composition may contain a surface modifier that surface-modifies the above inorganic substances (inorganic nitrides and other inorganic substances).

In the present specification, "surface modification" means a state where an organic substance is adsorbed onto at least a part of a surface of the inorganic substance. A form of the adsorption is not particularly limited, and may be in a bonded state. That is, the surface modification also includes a state in which an organic group obtained by desorbing a part of the organic substance is bonded to the surface of the inorganic substance. The bond may be any one of a covalent bond, a coordinate bond, an ionic bond, a hydrogen bond, a van der Waals bond, or a metallic bond. The surface modification may be performed so that a monomolecular film is formed on at least a portion of the surface. The monomolecular film is a single-layer film formed by chemical adsorption of organic molecules, and is known as a self-assembled monolayer (SAM). In the present specification, only a part of the surface of the inorganic substance may be surface-modified, or the entire surface of the inorganic substance may be surface-modified.

The phenolic compound and the compound contained in the epoxy compound are not included in the surface modifier.

In the composition, the inorganic substance may constitute surface-modified inorganic substance together with the surface modifier.

A method of producing the surface-modified inorganic substance is not particularly limited, and examples thereof include a method including a step of bringing the inorganic substance into contact with the surface modifier. The contact between the inorganic substance and the surface modifier is carried out, for example, by stirring in a mixed solution of the inorganic substance, the surface modifier, and the organic solvent.

In addition, the surface-modified inorganic substance may be separately prepared and then the prepared surface-modified inorganic substance may be mixed with a part or all of another component in the composition.

The composition preferably contains an organic silane molecule, and more preferably contains a compound having an alkoxysilyl group as a surface modifier (preferably a surface modifier for inorganic oxides, more preferably a surface modifier for aluminum oxide).

Examples of the organic silane molecule include 3-aminopropyltriethoxysilane, 3-(2-aminoethyl)aminopropyltriethoxysilane, 3-aminopropyltrimethoxysilane, 3-(2-aminoethyl) aminopropyltrimethoxysilane, N-phenyl-3-aminopropyltrimethoxysilane, 3-mercaptotriethoxysilane, and 3-ureidopropyltriethoxysilane.

One kind of the surface modifiers may be used singly, or two or more kinds thereof may be used in combination.

In a case where the composition contains a surface modifier, from a viewpoint of more excellent dispersibility of the inorganic substance, a mass ratio of the content of the surface modifier to the content of the inorganic substance (content of the surface modifier/content of inorganic substance) is preferably 0.0001 to 0.1, and more preferably 0.001 to 0.05.

In a case where the composition contains an inorganic oxide and an organic silane molecule, from the viewpoint of more excellent dispersibility of the inorganic oxide, the mass ratio of the content of the organic silane molecule to the content of the inorganic oxide (content of the organic silane molecule/content of inorganic oxide) is preferably 0.00001 to 0.1, and more preferably 0.00005 to 0.05.

<Other Curing Accelerators>

The composition may contain other curing accelerators other than the specific compound.

The kinds of other curing accelerators are not limited, and examples thereof include phosphine compounds other than specific compounds such as trialkylphosphine, tricycloalkylphosphine, tribenzylphosphine, diphenylcyclohexylphosphine, triphenylphosphine, triphenylphosphine triphenylborane, and tetraphenylphosphonium tetraphenylborate; imidazole compounds such as 2-ethyl-4-methylimidazole and 1-benzyl-2-methylimidazole; boron trifluoride amine complex, and the compound described in paragraph 0052 of JP2012-067225A.

One kind of the curing accelerators may be used singly, or two or more kinds thereof may be used.

In a case where the composition contains other curing accelerators, the content thereof is preferably 0.01% to 10% by mass with respect to the total solid content of the composition.

In a case where the composition contains the other curing accelerators, a content thereof is preferably 0.01% to 10% by mass and more preferably 0.1% to 5% by mass, with respect to the content of the epoxy compound.

<Dispersant>

The composition may further contain a dispersant.

In a case where the composition contains a dispersant, the dispersibility of the inorganic substance in the composition can be improved, and the thermally conductive properties and adhesiveness of the thermally conductive material can be improved.

The dispersant can be appropriately selected from known dispersants. Examples thereof include DISPERBYK-106 (produced by BYK-Chemie GmbH), DISPERBYK-111 (produced by BYK-Chemie GmbH), ED-113 (produced by Kusumoto Chemicals, Ltd.), AJISPER PN-411 (produced by Ajinomoto Fine-Techno Co., Inc.), and REB122-4 (produced by Showa Denko Materials Co., Ltd.).

One kind of the dispersants may be used singly, or two or more kinds thereof may be used.

In a case where the composition contains the dispersant, a content of the dispersant is preferably 0.01% to 10% by mass and more preferably 0.1% to 5% by mass, with respect to the content of the inorganic substance.

<Solvent>

The composition may further contain a solvent.

A kind of the solvent is not particularly limited, and an organic solvent is preferable. Examples of the organic solvent include cyclopentanone, cyclohexanone, ethyl acetate, methyl ethyl ketone, dichloromethane, and tetrahydrofuran.

In a case where the composition contains a solvent, a content of the solvent is preferably an amount such that the concentration of the solid contents in the composition is 20% to 90% by mass, more preferably an amount such that the concentration is 30% to 85% by mass, and even more preferably an amount such that the concentration is 40% to 85% by mass.

It is preferable that the present composition substantially does not contain a metal single body, alloys of two or more kinds of metal, metal-containing substances such as metal hydroxide, in addition to the above inorganic substances (inorganic nitrides and other inorganic substances). The term "substantially does not contain" in the present specification is intended to indicate that the content of the other components is 0.1% by mass or less with respect to the total solid content of the composition. A content of the above metal-containing substances in the present composition is more preferably 0.01% by mass or less with respect to the total solid content of the composition.

It is preferable that the thermally conductive material formed by using the composition also substantially does not contain the above metal-containing substance, and it is more preferable that the content of the above metal-containing substance is 0.01% by mass or less with respect to a total mass of the thermally conductive material.

It is preferable that the present composition substantially does not contain a compound that reacts or interacts with a specific compound, in addition to the above components, and it is more preferable that the content thereof is 0.01% by mass or less with respect to the total solid content of the composition. The compound that reacts with or interacts with a specific compound means a compound having a function of changing the chemical structure of the specific compound during storage of the present composition or during a curing treatment for forming a thermally conductive material. Examples of the compound that reacts with or interacts with the specific compound include a quinone compound and an ionic compound.

It is also preferable that the thermally conductive material formed using the composition substantially does not contain a compound that reacts or interacts with the above specific compound, and it is more preferable that the content thereof is 0.01% by mass with respect to the total mass of the thermally conductive material.

[Method for Producing Composition]

A method for producing the composition is not particularly limited, and the composition can be produced by mixing the aforementioned various components, for example. In a case of mixing, the various components may be mixed at a time or mixed sequentially.

A method of mixing the components is not particularly limited, and known methods can be used. A mixing device used for the mixing is preferably a submerged disperser, and examples thereof include a rotating and revolving mixer, a stirrer such as a high-speed rotating shear-type stirrer, a colloid mill, a roll mill, a high-pressure injection-type disperser, an ultrasonic disperser, a beads mill, and a homogenizer. One kind of the mixing devices may be used singly, or two or more kinds thereof may be used. A deaeration treatment may be performed before and after the mixing and/or simultaneously with the mixing.

[Thermally Conductive Material]

The thermally conductive material according to the embodiment of the present invention is formed using the composition according to the embodiment of the present invention.

The method for producing the thermally conductive material is not particularly limited, but for example, it is preferable to cure the composition according to the embodiment of the present invention to obtain a thermally conductive material containing the cured product. The method of curing the composition is not particularly limited, but a thermosetting treatment in which the thermosetting reaction is promoted by heating the composition is preferable.

A heating temperature during the thermosetting treatment is not particularly limited, and may be appropriately selected in a range of 50° C. to 250° C., for example. In addition, as the thermosetting treatment, a plurality of heating treatments having the same or different temperatures may be carried out.

The curing treatment is preferably performed on the composition which is formed in a film shape or a sheet shape. Specifically, for example, the composition may be applied to form a film, and the above curing treatment may be performed on the obtained coating film.

As the curing treatment, it is preferable to apply the composition on the substrate to form a coating film and cure the obtained coating film. In this case, after further bringing the coating film formed on the substrate into contact with another substrate, the curing treatment may be performed. A cured product (thermally conductive material) obtained after the curing may or may not be separated from one or both of the substrates.

In a case where the curing treatment is performed, after applying the composition onto different substrates to form respective coating films, the curing treatment may be performed in a state where the obtained coating films are in contact with each other. A cured product (thermally conductive material) obtained after the curing may or may not be separated from one or both of the substrates.

In addition, at a time of the curing treatment, press working may be performed. A press used for press working is not limited, and for example, a flat plate press may be used, or a roll press may be used.

In a case where the roll press is used, for example, it is preferable that a substrate with a coating film, which is obtained by forming a coating film on a substrate, is sandwiched between a pair of rolls in which two rolls face each other, and while rotating the pair of rolls to cause the substrate with a coating film to be passed, pressure is applied in a film thickness direction of the substrate with a coating film. In the substrate with a coating film, a substrate may be present on only one surface of a coating film, or a substrate may be present on both surfaces of a coating film. The substrate with a coating film may be passed through the roll press only once or a plurality of times.

Only one of the treatment by the flat plate press and the treatment by the roll press may be carried out, or both may be carried out.

In addition, the curing treatment may be completed at a time point when the composition is in a semi-cured state. The thermally conductive material in a semi-cured state may be disposed so as to be in contact with the device or the like to be used, then further cured by heating and the like, and the main curing may be performed. It is also preferable that the device and the thermally conductive material adhere to each other by heating and the like at the time of the main curing.

Regarding the preparation method of the thermally conductive material including a curing reaction, "Highly Thermally Conductive Composite Material" (CMC Publishing CO., LTD., written by Yoshitaka TAKEZAWA) can be referred to and the content thereof is incorporated in the present specification.

[Properties of Thermally Conductive Material]

A shape of the thermally conductive material is not particularly limited, and the thermally conductive material can be molded into various shapes according to the use. Examples of a typical shape of the molded thermally conductive material include a sheet shape and a particle shape, and the sheet shape is preferable. As the sheet-shaped thermally conductive material (thermally conductive sheet), a thermally conductive sheet made of a thermally conductive material is more preferable.

In addition, the thermally conductive properties of the thermally conductive material are preferably isotropic rather than anisotropic.

A film thickness of the thermally conductive sheet is not particularly limited, but is preferably 10 to 1,000 μm, more preferably 50 to 300 μm, and even more preferably 100 to 250 μm.

The film thickness of the thermally conductive sheet is an average film thickness. The film thickness of the thermally conductive sheet can be measured by measuring the film thickness of any points of the thermally conductive sheet using a known film thickness measuring device and calculating the average value thereof.

The thermally conductive material preferably has insulating properties (electrical insulating properties). In other words, the present composition is preferably a thermally conductive insulating composition.

For example, a volume resistivity of the thermally conductive material at 23° C. and a relative humidity of 65% is preferably $10^{10}$ Ω·cm or greater, more preferably $10^{12}$ Ω·cm or greater, and even more preferably $10^{14}$ Ω·cm or greater. An upper limit thereof is not particularly limited, but may be $10^{18}$ Ω·cm or less, for example.

As described above, the thermally conductive material according to the embodiment of the present invention may be a semi-cured product obtained by curing the composition of the present invention until it reaches a semi-cured state (so-called B stage state). That is, the thermally conductive material according to the embodiment of the present invention includes both a thermally conductive material which is a semi-cured product (thermally conductive material in a semi-cured state) and a completely cured product (thermally conductive material obtained by further curing from the semi-cured state).

A degree of progress of the curing treatment in the production of the thermally conductive material can be determined, for example, by measuring the amount of heat associated with the curing reaction using a differential scanning calorimeter (DSC).

More specifically, the object to be treated before the curing treatment (coating film of the composition and the like) and the object to be treated subjected to curing treatment (semi-cured product or completely cured product) are measured using DSC, respectively, and a total calorific value HA of the object to be treated before the curing treatment and the residual calorific value HB of the object to be treated subjected to curing treatment are obtained. Next, the obtained total calorific value HA and residual calorific value HB are substituted into Formula of $CR=((HA-HB)/HA)*100$ to calculate the cure rate CR (unit: %) of the semi-cured sheet. From the cure rate CR obtained as described, the cured state of the composition by the curing treatment can be determined.

In a case where the above cure rate CR of the object to be treated obtained by the curing treatment is 1% to 50%, it can be said that the object to be treated is a thermally conductive material (semi-cured product) in a semi-cured state. In addition, in a case where the cure rate CR of the object to be treated obtained by the curing treatment is more than 50%, it can be said that the object to be treated is a thermally conductive material (completely cured product) in a completely cured state.

In other words, the thermally conductive material which is a semi-cured product can be produced by carrying out a curing treatment using the present composition so that the above cure rate CR is 1% to 50%. In addition, the thermally conductive material which is a completely cured product can be produced by carrying out a curing treatment using the present composition so that the cure rate CR is more than 50%.

From a viewpoint of more excellent handleability, the cure rate CR of the semi-cured product is preferably 1% to 40%, and more preferably 1% to 30%.

The cure rate CR of the completely cured product is preferably 80% or greater, more preferably 90% or greater, and even more preferably 99% or greater. An upper limit of the cure rate CR of the completely cured product is not particularly limited and may be 100%.

[Use of Thermally Conductive Material]

The thermally conductive material can be used as a heat dissipation material such as a heat dissipation sheet, and can be used for dissipating heat from various devices. More specifically, a device with a thermally conductive layer is prepared by disposing a thermally conductive layer, which contains the thermally conductive material, on a device, and thus the heat generated from the device can be efficiently dissipated by the thermally conductive layer. The above thermally conductive layer may be a thermally conductive multilayer sheet which will be described later.

The thermally conductive material has excellent thermally conductive properties and high heat resistance, and thus is suitable for dissipating heat from a power semiconductor device used in various electrical machines such as a personal computer, a general household electric appliance, and an automobile.

In addition, the thermally conductive material has excellent thermally conductive properties and excellent handleability in a semi-cured state, and thus can also be used as a heat dissipation material which is disposed in a portion where light for photocuring is hardly reached, such as a gap between members of various devices. In addition, the present composition also has excellent adhesiveness, and thus can also be used as an adhesive having thermally conductive properties.

The thermally conductive material formed of the present composition may be used in combination with members other than the members formed of the present composition.

For example, the thermally conductive material may be used as a thermally conductive multilayer sheet having a layer (thermally conductive sheet) formed by using the present composition and other layers.

The thermally conductive multilayer sheet may have a sheet-shaped support as the above other layer.

Examples of the sheet-shaped support include a plastic film, a metal film, and a glass plate. Examples of a material for the plastic film include polyester such as polyethylene terephthalate (PET), polycarbonate, an acrylic resin, an epoxy resin, polyurethane, polyamide, polyolefin, a cellulose derivative, and silicone. Examples of the metal film include a copper film.

In addition, an adhesive layer and/or a pressure sensitive adhesive layer may be bonded to the thermally conductive material. By bonding the thermally conductive material to an object to which heat is to be transferred, such as a device, via such an adhesive layer and/or a pressure sensitive adhesive layer, firmer bonding between the thermally conductive material and the object can be achieved.

The thermally conductive multilayer sheet may be a thermally conductive multilayer sheet having a thermally conductive sheet and an adhesive layer or a pressure sensitive adhesive layer, which is provided on one surface or both surfaces of the thermally conductive sheet.

Furthermore, on one surface or both surfaces of the thermally conductive sheet, one of the adhesive layer and the pressure sensitive adhesive layer may be provided, or the both layers may be provided. The adhesive layer may be provided on one surface of the thermally conductive sheet, and the pressure sensitive adhesive layer may be provided on the other surface thereof. Moreover, on one surface or both surfaces of the thermally conductive sheet, the adhesive layer and/or the pressure sensitive adhesive layer may be partially provided, or may be provided over the entire surface.

The thermally conductive sheet in the thermally conductive multilayer sheet may be in a semi-cured state as described above. The adhesive layer in the thermally conductive multilayer sheet may be cured, may be in a semi-cured state, or may be in an uncured state.

<Adhesive Layer>

The adhesive layer preferably contains at least one kind of compound (a resin and/or a low-molecular-weight body) having adhesiveness.

The adhesive layer may further contain other components such as a filler, if necessary.

As the above compound having adhesiveness, a compound having insulating properties, adhesiveness, and/or flexibility, during adhesion is preferable.

In particular, from the viewpoints of the adhesiveness and the insulating properties, it is preferable to contain at least one selected from the group consisting of a polyimide resin, a modified polyimide resin, a polyamide imide resin, a modified polyamide imide resin, and an epoxy compound.

The epoxy compound may be an epoxy resin containing an acryl-modified rubber.

Examples of the polyimide resin and the modified polyimide resin include products represented by UPICOAT FS-100L (produced by UBE INDUSTRIES, LTD.), SEMICOFINE SP-300, SP-400, and SP-800 (produced by TORAY INDUSTRIES, INC.), U-IMIDE SERIES (produced by UNITIKA LTD.), and the like.

Examples of the polyamide imide resin and the modified polyamide imide resin include KS SERIES (produced by Showa Denko Materials Co., Ltd.), VIROMAX SERIES (produced by TOYOBO CO., LTD.), and TORLON (produced by SOLVAY SPECIALTY POLYMERS).

Among them, from the viewpoints of high heat resistance and high adhesiveness, it is preferable to use a modified polyamide imide resin represented by KS SERIES (produced by Showa Denko Materials Co., Ltd.).

One kind of the polyimide resin, the modified polyimide resin, the polyamide imide resin, and the modified polyamide imide resin, which are used for the adhesive layer, may be used singly, or two or more kinds thereof may be used.

For example, an adhesive layer can be formed by directly applying a varnish obtained by dissolving these resins in a solvent to a support such as a PET film, and drying the coating film to form a film.

Furthermore, an epoxy compound may be used as the compound having adhesiveness. For example, an epoxy composition containing an epoxy compound, a curing agent thereof, and a curing accelerator may be used to form an adhesive layer. It is also preferable that glycidyl acrylate is added to the epoxy composition.

For details of the epoxy composition, for example, the descriptions of JP2002-134531A, JP2002-226796A, and JP2003-221573A can also be referred to.

The epoxy compound used for the adhesive layer is not particularly limited as long as the epoxy compound is cured to exhibit an adhesive action. From a viewpoint of capable of improving fluidity of the coating film during lamination, a bisphenol A-type or bisphenol F-type liquid epoxy compound having a molecular weight of 500 or less is preferable. As the epoxy compound, a polyfunctional epoxy compound may be used for the purpose of increasing the Tg (glass transition temperature). Examples of the polyfunctional epoxy compound include a phenol novolac-type epoxy compound and a cresol novolac-type epoxy compound.

As the epoxy compound used for the adhesive layer, the epoxy compounds described as the epoxy compound contained in the present composition may be used.

Examples of the curing agent for the epoxy compound include polyamide, polyamine, an acid anhydride, polysulfide, boron trifluoride, and a phenolic compound (a phenol novolac resin, and bisphenol A, bisphenol F, bisphenol S, or the like, which is a compound having two or more phenolic hydroxyl groups in one molecule). From the viewpoint of excellent electrolytic corrosion resistance during moisture absorption, a phenol novolac resin, a bisphenol novolac resin, or a cresol novolac resin, which is a phenolic compound is preferable.

As the curing agent, the phenolic compounds described as the phenolic compound contained in the present composition may be used.

In a case where the curing agent is used, it is preferable to use a curing accelerator together with the curing agent. Examples of the curing accelerator include an imidazole compound and a phosphine compound, and a phosphine compound is preferable.

Examples of the imidazole compounds include 2-methylimidazole, 2-ethyl-4-methylimidazole, 1-cyanoethyl-2-phenylimidazole, and 1-cyanoethyl-2-phenylimidazolium trimellitate. The imidazole compounds are commercially available, for example, from SHIKOKU CHEMICALS CORPORATION under the trade names of 2E4MZ, 2PZ-CN, and 2PZ-CNS.

Examples of the phosphine compound include trialkylphosphine, tricycloalkylphosphine, tribenzylphosphine, diphenylcyclohexylphosphine, triphenylphosphine, diphenyl(alkylphenyl)phosphine, diphenyl(alkoxyphenyl)phosphine, bis(alkylphenyl)phenylphosphine, bis(alkoxyphenyl) phenylphosphine, tris(alkylphenyl)phosphine, tris (alkoxyphenyl)phosphine, triphenylphosphine triphenylborane, and tetraphenylphosphonium tetraphenylborate. The above phosphine compound may have a substituent such as a halogen atom.

It is also preferable that the epoxy compound used for the adhesive layer is used in combination with a high-molecular-weight resin compatible with the epoxy compound.

Examples of the high-molecular-weight resin compatible with the epoxy compound include a high-molecular-weight epoxy compound, a highly polar functional group-containing rubber, and a highly polar functional group-containing reactive rubber.

Examples of the highly polar functional group-containing reactive rubber include an acryl-modified rubber obtained by adding a highly polar functional group such as a carboxylic acid group to an acrylic rubber.

Here, being compatible with the epoxy compound means a property of forming a homogeneous mixture without being divided into two or more phases by being separated from the epoxy compound after curing.

A weight-average molecular weight of the high-molecular-weight resin is not particularly limited. From the viewpoints that tackiness of the adhesive in a B stage is reduced, or flexibility during curing is improved, the weight-average molecular weight is preferably 30,000 or greater.

The high-molecular-weight epoxy compound includes a high-molecular-weight epoxy compound having a weight-average molecular weight of 30,000 to 80,000, and an ultra-high-molecular-weight epoxy compound having a weight-average molecular weight of greater than 80,000 (refer to JP1995-59617B (JP-H7-59617B), JP1995-59618B (JP-H7-59618B), JP1995-59619B (JP-H7-59619B), JP1995-59620B (JP-H7-59620B), JP1995-64911B (JP-H7-64911B), and JP1995-68327B (JP-H7-68327B)), both of which are produced by Showa Denko Materials Co., Ltd. As the carboxylic acid group-containing acrylic rubber, for example, HTR-860P (trade name) is sold, by Nagase ChemteX Corporation.

In a case where the high-molecular-weight resin which is compatible with the epoxy compound and has a weight-average molecular weight of 30,000 or greater is used, in a case where the resin constituting the adhesive layer is set to 100 parts by mass, the addition amount thereof is preferably 10 parts by mass or greater, and more preferably 40 parts by mass or less.

In a case where the addition amount is 10 parts by mass or greater, improvement in flexibility of a phase (hereinafter, referred to as an epoxy compound phase) containing the epoxy compound as a main component, improvement in tackiness, and/or suppression of cracks are likely to be achieved, and insulating properties are less likely to deteriorate. In a case where the addition amount is 40 parts by mass or less, the Tg of the epoxy compound phase can be improved.

A weight-average molecular weight of the high-molecular-weight epoxy compound is preferably 20,000 or greater and 500,000 or less. Within this range, the strength and/or flexibility in a sheet state and/or a film state is improved, and tackiness is also likely to be suppressed.

One kind of the polyamide imide resin, the modified polyamide imide resin, and the epoxy compound, which are suitably used for the adhesive layer, may be used singly, or two or more kinds thereof may be used. In addition, a mixture in a varnish state in which these compounds are dissolved in a solvent may be used to form an adhesive layer. By applying such a mixture directly to a support such as a PET film and drying the solvent, the compounds are formed into a film, and can be used as an adhesive layer.

(Silane Coupling Agent)

A silane coupling agent may be blended in the adhesive layer in order to improve an interfacial bond between different kinds of materials.

Examples of the silane coupling agent include γ-glycidoxypropyltrimethoxysilane, γ-mercaptopropyltrimethoxysilane, γ-aminopropyltriethoxysilane, γ-ureidopropyltriethoxysilane, and N-β-aminoethyl-γ-aminopropyltrimethoxysilane.

Among them, from a viewpoint of adhesive strength, γ-mercaptopropyltrimethoxysilane or γ-aminopropyltriethoxysilane is preferable.

In a case where the adhesive layer contains the silane coupling agent, a blending amount thereof is preferably 0.1 to 10 parts by mass with respect to 100 parts by mass of the compound having the adhesiveness, from a viewpoint of an effect of addition and/or an influence on heat resistance.

(Filler)

The adhesive layer may contain a filler.

In order to improve the handleability and/or thermally conductive properties of the adhesive layer, impart flame retardance, adjust the melt viscosity, impart thixotropic properties, and/or improve the surface hardness, the adhesive layer preferably contains a filler, and more preferably contains an inorganic filler.

In a case where the adhesive layer contains a filler, a content thereof is not particularly limited, but 20 to 100 parts by volume is preferable with respect to 100 parts by volume of the above compound having adhesiveness contained in the adhesive layer.

From the viewpoint of the effect of blending, the content is more preferably 30 parts by volume or greater with respect to 100 parts by volume of the compound having the adhesiveness. In addition, from a viewpoint that deterioration in insulating properties or the like is suppressed by achieving optimization of a storage elastic modulus of the adhesive, improvement in adhesiveness, and/or suppression of voids, the content is preferably 50 parts by volume or less with respect to 100 parts by volume of the compound having the adhesiveness.

Examples of the inorganic filler include aluminum hydroxide, magnesium hydroxide, calcium carbonate, magnesium carbonate, calcium silicate, magnesium silicate, calcium oxide, magnesium oxide, alumina (aluminum oxide), aluminum nitride, aluminum borate whisker, boron nitride, crystalline silica, amorphous silica, silicon nitride, talc, mica, and barium sulfate.

Among them, from the viewpoint that heat dissipating properties are favorable due to high thermal conductivity, impurities are likely to be controlled, and heat resistance and insulating properties are favorable, alumina, boron nitride, or aluminum nitride is preferable.

One kind of the fillers may be used singly, or two or more kinds thereof may be used.

An average particle diameter of the filler contained in the adhesive layer is not particularly limited, but from a viewpoint of thermally conductive properties, is preferably 0.1 to 10 μm, and more preferably 0.2 to 5 μm.

From the viewpoint of balancing adhesiveness and thermally conductive properties, a content of the filler in the adhesive layer is preferably 50% by volume or less (for example, 20% to 50% by volume) with respect to the total volume of the adhesive layer.

In particular, from a viewpoint of adhesive strength and thermal conductivity, it is preferable that the adhesive layer contains at least one selected from the group consisting of an epoxy compound and a modified polyamide imide resin as a compound having adhesiveness, contains at least one selected from the group consisting of alumina and silicon oxide as a filler, a content of the filler is 25 to 100 parts by volume with respect to 100 parts by volume of the compound having adhesiveness, and an average particle diameter of the filler is 0.2 to 5 μm.

From a viewpoint of improving thermal conductivity and adhesiveness, a film thickness of the adhesive layer is preferably 1 to 16 μm, more preferably 2 to 15 μm, even more preferably 3 to 14 μm, and particularly preferably 4 to 12 μm.

The film thickness of the adhesive layer can be measured using a micrometer, a stylus-type film thickness meter, or a needle-type film thickness meter.

<Pressure Sensitive Adhesive Layer>

As a material for the pressure sensitive adhesive layer, any materials can be used without particular limitation as long as the materials are known as various pressure sensitive adhesives and/or thermosetting materials and have the required heat resistance performance and thermally conductive performance. In addition, a pressure sensitive adhesive of which the thermally conductive properties are improved by mixing various thermally conductive fillers in the pressure sensitive adhesive layer may be used.

Examples of the pressure sensitive adhesive, which forms the pressure sensitive adhesive layer, include an acrylic pressure sensitive adhesive, an olefin-based pressure sensitive adhesive, a silicone-based pressure sensitive adhesive, a natural rubber-based pressure sensitive adhesive, and a synthetic rubber-based pressure sensitive adhesive.

From the viewpoint that outgas is less likely to be generated in the use in the vicinity of a semiconductor in an electronic machine, an acrylic pressure sensitive adhesive or an olefin-based pressure sensitive adhesive is preferable. Moreover, from the viewpoint of heat resistance, a silicone-based pressure sensitive adhesive containing a silicone resin as a main raw material is preferable.

Furthermore, the "pressure sensitive adhesive containing a silicone resin as a main raw material" is a pressure sensitive adhesive containing 60% by mass or greater (preferably 80% by mass or greater) of the silicone resin with respect to the total mass of the pressure sensitive adhesive.

Examples of the pressure sensitive adhesive containing a silicone resin as a main raw material include a peroxide crosslinking (curing)-type silicone-based pressure sensitive adhesive and an addition reaction-type silicone-based pressure sensitive adhesive. Among them, from the viewpoint that the thickness accuracy is high in a case of being formed into a thin layer, and the pressure sensitive adhesive layer can be easily formed by a transfer method, an addition reaction-type silicone-based pressure sensitive adhesive is preferable.

Examples of the addition reaction-type silicone-based pressure sensitive adhesive include pressure sensitive adhesives which contain a silicone rubber and a silicone resin, and further contain, if necessary, an additive such as a crosslinking agent, a filler, a plasticizer, an antiaging agent, an antistatic agent, and/or a colorant (a pigment, a dye, or the like).

The silicone rubber is not particularly limited as long as the silicone rubber is a silicone-based rubber component, but a silicone rubber, which contains an organopolysiloxane having a phenyl group is preferable, and a silicone rubber containing organopolysiloxane having methylphenylsiloxane as a main constitutional unit is more preferable. Various functional groups such as vinyl groups may be introduced into the above organopolysiloxane, if necessary.

The silicone resin is not particularly limited as long as the silicone resin is a silicone-based resin used for a silicone-based pressure sensitive adhesive, and examples thereof include a silicone resin which contains organopolysiloxane consisting of a (co)polymer having at least one unit selected from the group consisting of a unit consisting of a constitutional unit "$R_3SiO_{1/2}$", a unit consisting of a constitutional unit "$SiO_2$", a unit consisting of a constitutional unit "$RSiO_{3/2}$", and a unit consisting of a constitutional unit "$R_2SiO$". Furthermore, R in the constitutional unit represents a hydrocarbon group or a hydroxyl group.

Examples of the acrylic pressure sensitive adhesive include a homopolymer and a copolymer of (meth)acrylic acid and/or (meth)acrylic acid ester.

Among them, from a viewpoint of more excellent flexibility, chemical stability, workability, and/or controllability of pressure sensitive adhesive properties, the acrylic pressure sensitive adhesive is preferably a poly(meth)acrylic acid ester-based high-molecular-weight compound containing butyl acrylate, 2-ethylhexyl acrylate, or the like as a main raw material component.

As the high-molecular-weight compound, a copolymer having a structure in which a monomer selected from butyl acrylate, ethyl acrylate, and 2-ethylhexyl acrylate and a monomer having a polar group selected from acrylic acid, acrylonitrile, and hydroxyethyl acrylate are copolymerized, and a polar group such as a —COOH group, a —CN group, and an —OH group is introduced is preferable.

In addition, a crosslinked structure may be introduced into the acrylic pressure sensitive adhesive within a range in which flexibility is not impaired. By introducing the crosslinked structure, long-term close adhesion retaining properties and film hardness are likely to be improved. For example, the crosslinked structure can be introduced into the polymer by reacting a polar group of a polymer having a polar group such as an —OH group with a functional group of a compound having a plurality of functional groups bonded to a polar group such as an isocyanate group and an epoxy group.

EXAMPLES

Hereinafter, the present invention will be described in more detail based on Examples. The material, the use amount, the proportion, the details of treatments, the procedure of treatments, and the like shown in the following Examples can be appropriately changed within a range that does not depart from the gist of the present invention. Accordingly, the scope of the present invention is not limitedly interpreted by the following Examples.

[Preparation and Evaluation of Composition]

[Each Component]

Each component used in the preparation of the compositions of each Example and each Comparative Example is shown below.

<Phenolic Compound>

Phenolic compounds used in Examples or Comparative Examples will be shown below.

The following compounds A-1, A-2, and A-3 correspond to the compound represented by Formula (P1), and the following compound A-4 corresponds to the compound represented by Formula (P3).

The following compound A-3 is cresol novolac ("LF-100" produced by Lignyte Co., Ltd., weight-average molecular weight 5000).

A-1

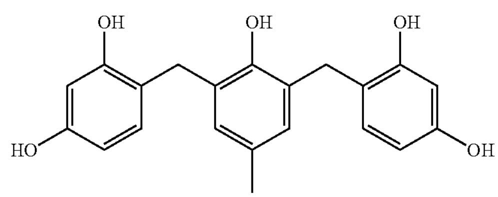

Molecular Weight: 352.39

A-2

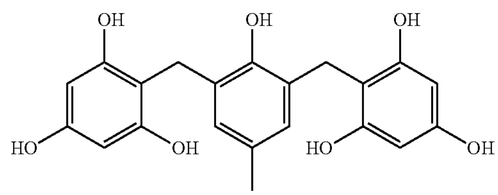

Molecular Weight: 384.38

A-3

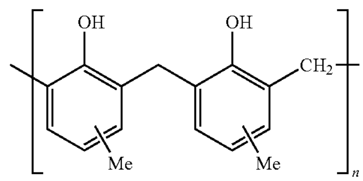

-continued

A-4

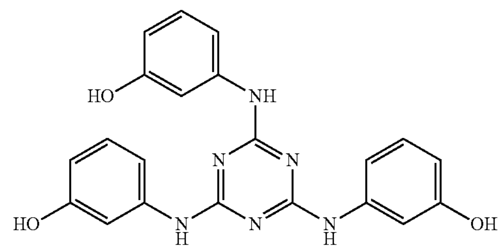

Molecular Weight: 402.41

<Epoxy Compound>

Epoxy compounds used in the preparation of the composition are shown below.

Moreover, the following compound B-3 is a mixture of two kinds of epoxy compounds (trade name: EPOTOHTO ZX-1059, produced by Tohto Chemical Industry Co., Ltd.).

In addition, the following compound B-8 is "EPPN-201" produced by Nippon Kayaku Co., Ltd.

B-1

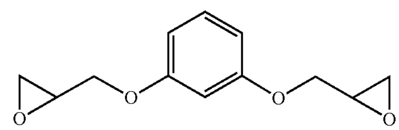

Molecular Weight: 222.24

B-2

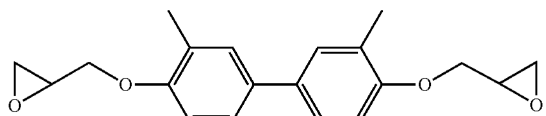

Molecular Weight: 354.45

B-3

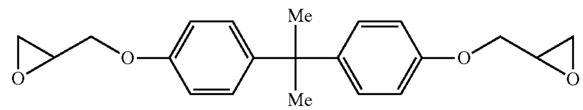

Molecular Weight: 340.42

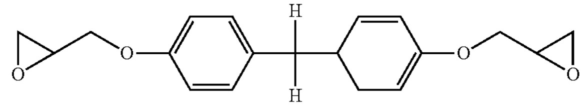

Molecular Weight: 312.37

B-4

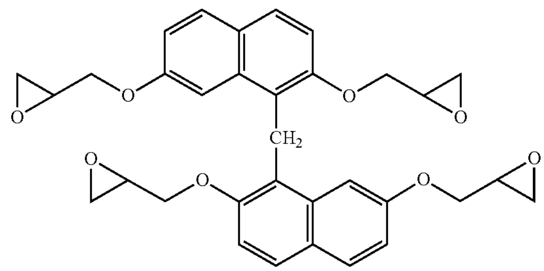

Molecular Weight: 556.61

-continued

B-5

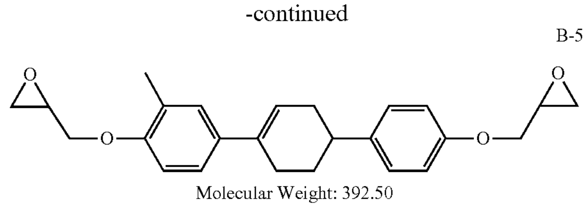

Molecular Weight: 392.50

B-6

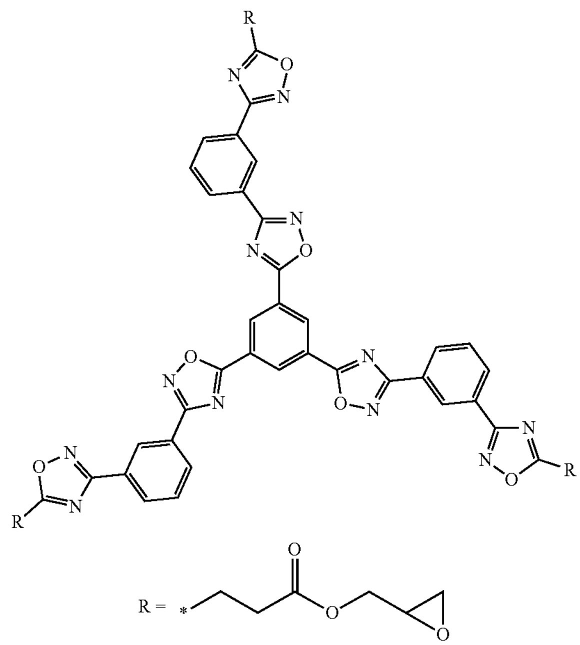

Molecular Weight: 1099

B-7

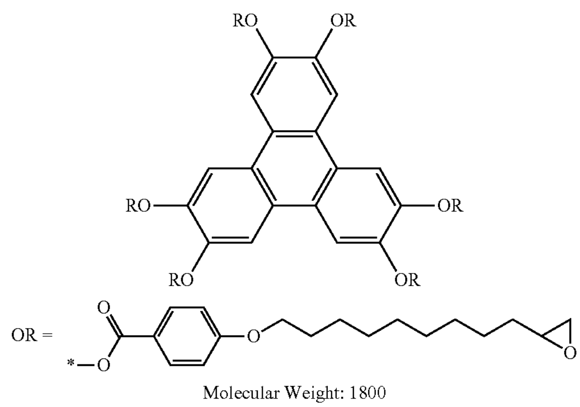

Molecular Weight: 1800

B-8

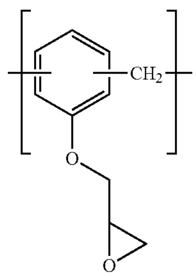

<Curing Accelerator>

Curing accelerators (specific compounds or comparative compounds) used in Examples and Comparative Examples are shown below. The following C-1 to C-7 are specific compounds, and X-1 is a comparative compound that does not correspond to the specific compound.

"C-1": Tris(o-tolyl)phosphine
"C-2": Tris(4-trifluoromethylphenyl)phosphine
"C-3": Tris(p-tolyl)phosphine
"C-4": Tris(o-methoxyphenyl)phosphine
"C-5": Tris(o-n-butylphenyl)phosphine
"C-6": Bis(o-tolyl)phenylphosphine
"C-7": Diphenyl(o-tolyl)phosphine
"X-1": Triphenylphosphine <Inorganic Substance>

In Examples and Comparative Examples, the following inorganic substances (inorganic nitride and inorganic oxide) were used.

"HP-40 MF100": Aggregated boron nitride particles (average particle diameter: 40 μm, produced by Mizushima Ferroalloy Co., Ltd.)

"SP-3": Scaly boron nitride particles (average particle diameter: 4 μm, produced by Denka Co., Ltd.)

"SGPS": Aggregated boron nitride particles (average particle diameter: 12 μm, produced by Denka Co., Ltd.)

"AA-3": Aluminum oxide particles (average particle diameter: 3 μm, produced by Sumitomo Chemical Co., Ltd.)

"AA-04": Aluminum oxide particles (average particle diameter: 0.4 μm, produced by Sumitomo Chemical Co., Ltd.)

<Surface Modifier>

The following compound ("KBM-573" produced by Shin-Etsu Chemical Co., Ltd., organic silane molecule) was used as a surface modifier for aluminum oxide.

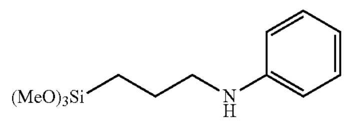

<Solvent>

Cyclopentanone was used as a solvent.

Reference Examples 1 to 7, Comparative Reference Examples 1 to 2

[Preparation of Curable Composition]

Combinations of the phenolic compound and the epoxy compound shown in Table 1 below were blended so that a ratio of a phenolic hydroxyl group of the phenolic compound to an epoxy group of the epoxy compound is 50/50 in molar ratio and the sum of both compounds is 21 g, and a mixed solution was prepared. The curing accelerator shown in Table 1 below was added to the obtained mixed solution in an amount of 3% by mass with respect to the phenolic compound to prepare a curable composition.

[Evaluation of Curable Composition]

Using "DSC320/6200" produced by Seiko Instruments Inc., the reaction behavior of each curable composition was measured under a temperature rising condition of 10° C./min. Based on the measurement results, the rising point of the reaction peak was defined as a reaction start temperature (° C.). Each curing accelerator was compared from the reaction start temperature (° C.), reaction peak temperature (° C.), and half value width (° C.) of the curable composition of each Reference Example and each Comparative Reference Example.

TABLE 1

| | Composition for test | | | Evaluation | | |
|---|---|---|---|---|---|---|
| | Phenolic compound | Epoxy compound | Curing accelerator | Reaction start temperature [° C.] | Reaction peak temperature [° C.] | Half value width [° C.] |
| Reference Example 1 | A-4 | B-1 | C-1 | 109 | 152 | 22 |
| Reference Example 2 | A-4 | B-1 | C-2 | 108 | 165 | 27 |
| Reference Example 3 | A-4 | B-1 | C-3 | 83 | 145 | 35 |
| Reference Example 4 | A-4 | B-1 | C-4 | 90 | 148 | 30 |
| Reference Example 5 | A-4 | B-1 | C-5 | 110 | 155 | 22 |
| Reference Example 6 | A-4 | B-1 | C-6 | 90 | 149 | 32 |
| Reference Example 7 | A-4 | B-1 | C-7 | 90 | 147 | 31 |
| Comparative Reference Example 1 | A-4 | B-1 | None | 119 | 168 | 25 |
| Comparative Reference Example 2 | A-4 | B-1 | X-1 | 81 | 144 | 36 |

From the results shown in Table 1, it was confirmed that the compositions of Reference Examples 1 to 7 containing the phenolic compound, the epoxy compound, and the specific compound have a high reaction start temperature during the curing treatment compared to the composition of Comparative Reference Example 2 containing triphenylphosphine as the curing accelerator X-1, and thus it is possible to suppress rapid progress of curing reaction at a starting stage of the curing treatment.

In addition, it was confirmed that in the composition for forming a thermally conductive material containing a phenolic compound, an epoxy compound, and a specific compound, the reaction peak temperature is significantly lower compared to the composition of Comparative Reference Example 1 to which no curing accelerator is added, and the reaction peak is sharper compared to the composition of Comparative Reference Example 2 containing the curing accelerator X-1, in a case where curing treatment is further performed on the thermally conductive material in a semi-cured state, the curing reaction inside rapidly proceeds, the cure rate is closer to 100%, and a completely cured product having more excellent thermally conductive properties can be formed.

Examples 1 to 43, Comparative Examples 1 to 2

[Preparation of Composition]

Combinations of the phenolic compound and the epoxy compound shown in Table 2 below were blended so that a total amount (g) of both the phenolic compound and the epoxy compound becomes the amount described in Table 2, and a ratio of the phenolic hydroxyl group of the phenolic compound to the epoxy group of the epoxy compound becomes a molar ratio described in Table 1, and a curing solution was prepared.

After mixing the entire amount of the obtained curing solution, the solvent, the surface modifier, and the curing accelerator in this order, a filler (inorganic nitride, inorganic oxide) was added. The obtained mixture was treated for 5 minutes with a rotating and revolving mixer (produced by THINKY CORPORATION, AWATORI RENTARO ARE-310) to obtain a composition (composition for forming a thermally conductive material) of each Example and each Comparative Example.

Here, the addition amount of the solvent was set such that the concentration of the solid content in the composition was 50% to 80% by mass. The concentration of the solid content in the composition was adjusted for each composition within the above range so that the viscosity of the composition was about the same.

The addition amount of the curing accelerator (specific compound or comparative compound), the surface modifier, and the filler (inorganic nitride and inorganic oxide) was the amount (g) shown in Table 2.

[Preparation of Semi-Cured Sheet (Thermally Conductive Sheet in Semi-Cured State)]

Using an applicator with a micrometer, the prepared composition was uniformly applied on a mold release surface of the mold-released polyester film ("PET756501", produced by Lintec Corporation, film thickness 75 μm) and left to stand at 120° C. for 4 minutes to prepare a polyester film with an uncured coating film (unheated sheet).

The mold-released polyester film was attached to the obtained polyester film with a coating film so that the mold release surface was in contact with the coating film. The obtained laminate was crimped with a roll press machine at 100° C. under air to prepare a laminate consisting of a semi-cured sheet (average film thickness 120 μm) and two polyester films.

[Preparation of Thermally Conductive Sheet]

A laminate prepared by the above method was hot-pressed under air (treated at a hot plate temperature of 180° C. and at a pressure of 20 MPa for 5 minutes, then further treated at a hot plate temperature of 180° C. and at a normal pressure for 90 minutes), and a coating film was cured to obtain a resin sheet. The polyester films on both surfaces of the resin sheet were peeled off to obtain a thermally conductive sheet having an average film thickness of 120 μm.

[Evaluation of Semi-Cured Sheet]

<Cure Rate>

The two polyester films were peeled off from the laminate obtained as described above, and the semi-cured sheet was taken out.

Using "DSC320/6200" produced by Seiko Instruments Inc., the reaction behavior of the unheated sheet and the semi-cured sheet obtained as described above was measured under a temperature rising condition of 10° C./min to obtain both of a calorific value (total calorific value HA) of the unheated sheet and a calorific value (residual calorific value HB) of the semi-cured sheet. The obtained total calorific value HA and residual calorific value HB were substituted into the formula of CR=((HA−HB)/HA)*100 to obtain a cure rate CR (%) of the semi-cured sheet. From the obtained cure rate CR, evaluation was made based on the following evaluation criteria.

(Evaluation Criteria)

"A": Cure rate CR is less than 30%

"B": Cure rate CR is 30% or greater and less than 40%

"C": Cure rate CR is 40% or greater and less than 50%

"D": Cure rate CR is 50% or greater

<Handleability>

The semi-cured sheet of each Example and each Comparative Example was cut into strips of 5 cm×10 cm to prepare a sample for bending tests. The obtained sample was subjected to a bending test using a cylindrical mandrel testing machine (produced by Cortec Co., Ltd.) according to the method described in JIS K 5600-5-1. From diameters of the mandrels used in bending tests when cylindrical mandrels of which diameters are 32, 25, 20, 19, 16, 13, 12, 10, 9, 8, 6, 5, 4, 3, and 2 mm were used and samples were broken, handleability of the semi-cured sheet were evaluated based on the following evaluation criteria. The shorter the diameter of the mandrel used when the samples were broken, the better the handleability of the semi-cured sheet.

(Evaluation Criteria)

"A" Not broken at 20 mm, broken or not broken at 19 mm or less

"B": Not damaged at 25 mm, damaged at 20 mm

"C": Not damaged at 32 mm, damaged at 25 mm

"D": Damaged at 32 mm

[Evaluation of Thermosetting Sheet]

<Thermally Conductive Properties>

The thermal conductivity of the thermally conductive sheet of each Example and each Comparative Example prepared by the above method was measured by the following method, and the thermally conductive properties were evaluated according to the following evaluation criteria, from the measurement results. The higher the measured value of the thermal conductivity, the more excellent the thermally conductive properties of the thermally conductive sheet.

(Measurement of Thermal Conductivity (W/m·k))

(1) Using "LFA467" produced by NETZSCH Japan K. K., the thermal diffusivity in a film thickness direction of the thermally conductive sheet was measured by a laser flash method.

(2) Using the balance "XS204" produced by Mettler Toledo, the specific gravity of the thermally conductive sheet was measured by the Archimedes method (using the "solid specific gravity measuring kit").

(3) Using "DSC320/6200" produced by Seiko Instruments Inc., the specific heat of the thermally conductive sheet at 25° C. was obtained under a temperature rising condition of 10° C./min.

(4) The obtained thermal diffusivity was multiplied by the specific gravity and the specific heat to calculate the thermal conductivity of the thermally conductive sheet.

(Evaluation Criteria of Thermally Conductive Properties)

"A": 15 W/m-K or greater

"B": 13 W/m-K or greater and less than 15 W/m-K

"C": 10 W/m-K or greater and less than 13 W/m-K

"D": Less than 10 W/m-K

<Dielectric Breakdown Voltage (Withstand Voltage)>

The dielectric breakdown voltage of the thermally conductive sheet of each Example and each Comparative Example prepared by the above method at 23° C. and a relative humidity of 65% was measured using a withstand voltage tester (produced by Kikusui Electronics Co., Ltd.).

From the measured dielectric breakdown voltage (kV (200 μm conversion)), the dielectric breakdown voltage (withstand voltage) was evaluated according to the following evaluation criteria. The higher the measured value, the more excellent the withstand voltage of the thermally conductive sheet.

(Evaluation Criteria of Withstand Voltage)

"A": 10 kV or greater

"B": 8 kV or greater and less than 10 kV

"C": 6 kV or greater and less than 8 kV

"D": less than 6 kV

<Copper Foil Peel Strength>

The two polyester films were peeled off from the laminate obtained by the above method, and the obtained semi-cured sheet was cut into strips of 20 mm×60 mm, and sandwiched between an electrolytic copper foil (20 mm×100 mm, thickness: 35 μm) which is an adherend and an aluminum plate (30 mm×60 mm, thickness: 1 mm). The obtained laminate was hot-pressed under air (treated at a hot plate temperature of 180° C. and a pressure of 20 MPa for 5 minutes, then treated at a hot plate temperature of 180° C. and a normal pressure for 90 minutes) to obtain an aluminum base substrate with a copper foil integrated with the thermally conductive sheet and the adherend.

Using a digital force gauge (ZTS-200N, produced by Imada Co., Ltd.) and a 90-degree peeling test jig (P90-200N-BB, produced by Imada Co., Ltd.), the copper foil peel strength of the obtained sample was measured according to a method of measuring the peel strength under normal conditions described in JIS C 6481. The peeling of the copper foil in the peel strength test was performed at an angle of 900 and a peeling rate of 50 mm/min with respect to the aluminum base substrate with a copper foil.

From the measured copper foil peel strength, the copper foil peel strength of the thermally conductive sheet was evaluated based on the following criteria. The higher the measured value, the more excellent the peel strength of the thermally conductive sheet.

(Evaluation Criteria of Copper Foil Peel Strength)

"A": Peel strength is 5 N/cm or greater

"B": Peel strength is 4 N/cm or greater and less than 5 N/cm

"C": Peel strength is 3 N/cm or greater and less than 4 N/cm

"D": Peel strength is less than 3 N/cm

[Result]

Table 2 shows the kind and addition amount (g) of the phenolic compound, the epoxy compound, the curing accelerator (specific compound or comparative compound), the surface modifier (for inorganic oxide), the filler (inorganic nitride and inorganic oxide) used in the preparation of the compositions of each Example and each Comparative Example, and the evaluation results of the semi-cured sheet and the thermally conductive sheet.

In Table 2, the column of "total amount" indicates the sum (g) of the addition amount of the used phenolic compound and the addition amount of the epoxy compound.

The column of "phenolic hydroxyl group/epoxy group" indicates the ratio (molar ratio) of the phenolic hydroxyl group of the used phenolic compound to the epoxy group of the epoxy compound.

TABLE 2

| | Composition of composition | | | | | | | | Evaluation | | | | |
|---|---|---|---|---|---|---|---|---|---|---|---|---|---|
| | | | | | | | Inorganic substance | | Semi-cured sheet | | Thermally conductive sheet | | |
| | Phenolic compound | Epoxy compound | Total amount [g] | Phenolic hydroxyl group/epoxy group | Curing accelerator (Amount [g]) | Surface modifier (Amount [g]) | Inorganic nitride (Amount [g]) | Inorganic oxide (Amount [g]) | Cure rate | Handleability | Thermal conductivity [W/mk] | Withstand voltage [kV/mm] | Peel strength [N/cm] |
| Example 1 | A-1 | B-1 | 21 | 50/50 | C-1 (0.3) | KBM-573 (0.1) | HP-40 (53) | AA-3/AA-04 (18/8) | A | A | B | B | B |
| Example 2 | A-2 | B-1 | 21 | 50/50 | C-1 (0.3) | KBM-573 (0.1) | HP-40 (53) | AA-3/AA-04 (18/8) | A | A | B | B | B |
| Example 3 | A-3 | B-1 | 21 | 50/50 | C-1 (0.3) | KBM-573 (0.1) | HP-40 (53) | AA-3/AA-04 (18/8) | A | A | B | B | B |
| Example 4 | A-4 | B-1 | 21 | 50/50 | C-1 (0.3) | KBM-573 (0.1) | HP-40 (53) | AA-3/AA-04 (18/8) | A | A | A | A | A |
| Example 5 | A-4 | B-1 | 21 | 50/50 | C-2 (0.3) | KBM-573 (0.1) | HP-40 (53) | AA-3/AA-04 (18/8) | A | A | C | C | A |
| Example 6 | A-4 | B-1 | 21 | 50/50 | C-3 (0.3) | KBM-573 (0.1) | HP-40 (53) | AA-3/AA-04 (18/8) | C | C | A | A | A |
| Example 7 | A-4 | B-1 | 21 | 50/50 | C-4 (0.3) | KBM-573 (0.1) | HP-40 (53) | AA-3/AA-04 (18/8) | B | B | A | A | A |
| Example 8 | A-4 | B-1 | 21 | 50/50 | C-5 (0.3) | KBM-573 (0.1) | HP-40 (53) | AA-3/AA-04 (18/8) | A | A | A | A | A |
| Example 9 | A-4 | B-1 | 21 | 50/50 | C-6 (0.3) | KBM-573 (0.1) | HP-40 (53) | AA-3/AA-04 (18/8) | B | B | A | A | A |
| Example 10 | A-4 | B-1 | 21 | 50/50 | C-7 (0.3) | KBM-573 (0.1) | HP-40 (53) | AA-3/AA-04 (18/8) | B | B | A | A | A |
| Example 11 | A-1 | B-2 | 21 | 50/50 | C-1 (0.3) | KBM-573 (0.1) | HP-40 (53) | AA-3/AA-04 (18/8) | A | A | B | B | B |
| Example 12 | A-2 | B-2 | 21 | 50/50 | C-1 (0.3) | KBM-573 (0.1) | HP-40 (53) | AA-3/AA-04 (18/8) | A | A | B | B | B |
| Example 13 | A-3 | B-2 | 21 | 50/50 | C-1 (0.3) | KBM-573 (0.1) | HP-40 (53) | AA-3/AA-04 (18/8) | A | A | C | B | B |
| Example 14 | A-4 | B-2 | 21 | 50/50 | C-1 (0.3) | KBM-573 (0.1) | HP-40 (53) | AA-3/AA-04 (18/8) | A | A | A | A | A |
| Example 15 | A-1 | B-3 | 21 | 50/50 | C-1 (0.3) | KBM-573 (0.1) | HP-40 (53) | AA-3/AA-04 (18/8) | A | A | B | B | B |

TABLE 3

| | Composition of composition | | | | | | | | Evaluation | | | | |
|---|---|---|---|---|---|---|---|---|---|---|---|---|---|
| | | | | | | | Inorganic substance | | Semi-cured sheet | | Thermally conductive sheet | | |
| | Phenolic compound | Epoxy compound | Total amount [g] | Phenolic hydroxyl group/epoxy group | Curing accelerator (Amount [g]) | Surface modifier (Amount [g]) | Inorganic nitride (Amount [g]) | Inorganic oxide (Amount [g]) | Cure rate | Handleability | Thermal conductivity [W/mk] | Withstand voltage [kV/mm] | Peel strength [N/cm] |
| Example 16 | A-2 | B-3 | 21 | 50/50 | C-1 (0.3) | KBM-573 (0.1) | HP-40 (53) | AA-3/AA-04 (18/8) | A | A | B | B | B |
| Example 17 | A-3 | B-3 | 21 | 50/50 | C-1 (0.3) | KBM-573 (0.1) | HP-40 (53) | AA-3/AA-04 (18/8) | A | A | C | B | B |
| Example 18 | A-4 | B-3 | 21 | 50/50 | C-1 (0.3) | KBM-573 (0.1) | HP-40 (53) | AA-3/AA-04 (18/8) | A | A | A | A | A |
| Example 19 | A-1 | B-4 | 21 | 50/50 | C-1 (0.3) | KBM-573 (0.1) | HP-40 (53) | AA-3/AA-04 (18/8) | A | A | B | B | B |
| Example 20 | A-2 | B-4 | 21 | 50/50 | C-1 (0.3) | KBM-573 (0.1) | HP-40 (53) | AA-3/AA-04 (18/8) | A | A | B | B | B |
| Example 21 | A-3 | B-4 | 21 | 50/50 | C-1 (0.3) | KBM-573 (0.1) | HP-40 (53) | AA-3/AA-04 (18/8) | A | A | C | B | B |
| Example 22 | A-4 | B-4 | 21 | 50/50 | C-1 (0.3) | KBM-573 (0.1) | HP-40 (53) | AA-3/AA-04 (18/8) | A | A | A | A | A |
| Example 23 | A-1 | B-5 | 21 | 50/50 | C-1 (0.3) | KBM-573 (0.1) | HP-40 (53) | AA-3/AA-04 (18/8) | A | A | B | B | B |
| Example 24 | A-2 | B-5 | 21 | 50/50 | C-1 (0.3) | KBM-573 (0.1) | HP-40 (53) | AA-3/AA-04 (18/8) | A | A | B | B | B |
| Example 25 | A-3 | B-5 | 21 | 50/50 | C-1 (0.3) | KBM-573 (0.1) | HP-40 (53) | AA-3/AA-04 (18/8) | A | A | B | B | B |
| Example 26 | A-4 | B-5 | 21 | 50/50 | C-1 (0.3) | KBM-573 (0.1) | HP-40 (53) | AA-3/AA-04 (18/8) | A | A | A | A | A |
| Example 27 | A-1 | B-6 | 21 | 50/50 | C-1 (0.3) | KBM-573 (0.1) | HP-40 (53) | AA-3/AA-04 (18/8) | A | A | B | B | B |

TABLE 3-continued

| | Composition of composition | | | | | | | | Evaluation | | | | |
|---|---|---|---|---|---|---|---|---|---|---|---|---|---|
| | | | | | | | Inorganic substance | | | | Thermally conductive sheet | | |
| | Phenolic compound | Epoxy compound | Total amount [g] | Phenolic hydroxyl group/epoxy group | Curing accelerator (Amount [g]) | Surface modifier (Amount [g]) | Inorganic nitride (Amount [g]) | Inorganic oxide (Amount [g]) | Semi-cured sheet Cure rate | Semi-cured sheet Handleability | Thermal conductivity [W/mk] | Withstand voltage [kV/mm] | Peel strength [N/cm] |
| Example 28 | A-2 | B-6 | 21 | 50/50 | C-1 (0.3) | KBM-573 (0.1) | HP-40 (53) | AA-3/AA-04 (18/8) | A | A | B | B | B |
| Example 29 | A-3 | B-6 | 21 | 50/50 | C-1 (0.3) | KBM-573 (0.1) | HP-40 (53) | AA-3/AA-04 (18/8) | A | A | C | B | B |
| Example 30 | A-4 | B-6 | 21 | 50/50 | C-1 (0.3) | KBM-573 (0.1) | HP-40 (53) | AA-3/AA-04 (18/8) | A | A | A | A | A |

TABLE 4

| | Composition of composition | | | | | | | | Evaluation | | | | |
|---|---|---|---|---|---|---|---|---|---|---|---|---|---|
| | | | | | | | Inorganic substance | | | | Thermally conductive sheet | | |
| | Phenolic compound | Epoxy compound | Total amount [g] | Phenolic hydroxyl group/epoxy group | Curing accelerator (Amount [g]) | Surface modifier (Amount [g]) | Inorganic nitride (Amount [g]) | Inorganic oxide (Amount [g]) | Semi-cured sheet Cure rate | Semi-cured sheet tivity [W/mk] | Thermal conduc- voltage [kV/mm] | With-stand strength [N/cm] | Peel strength [N/cm] |
| Example 31 | A-1 | B-7 | 21 | 50/50 | C-1 (0.3) | KBM-573 (0.1) | HP-40 (53) | AA-3/AA-04 (18/8) | A | A | B | B | B |
| Example 32 | A-2 | B-7 | 21 | 50/50 | C-1 (0.3) | KBM-573 (0.1) | HP-40 (53) | AA-3/AA-04 (18/8) | A | A | B | B | B |
| Example 33 | A-3 | B-7 | 21 | 50/50 | C-1 (0.3) | KBM-573 (0.1) | HP-40 (53) | AA-3/AA-04 (18/8) | A | A | C | B | B |
| Example 34 | A-4 | B-7 | 21 | 50/50 | C-1 (0.3) | KBM-573 (0.1) | HP-40 (53) | AA-3/AA-04 (18/8) | A | A | A | A | A |
| Example 35 | A-1 | B-8 | 21 | 50/50 | C-1 (0.3) | KBM-573 (0.1) | HP-40 (53) | AA-3/AA-04 (18/8) | A | A | B | B | B |
| Example 36 | A-2 | B-8 | 21 | 50/50 | C-1 (0.3) | KBM-573 (0.1) | HP-40 (53) | AA-3/AA-04 (18/8) | A | A | B | B | B |
| Example 37 | A-3 | B-8 | 21 | 50/50 | C-1 (0.3) | KBM-573 (0.1) | HP-40 (53) | AA-3/AA-04 (18/8) | A | A | C | B | B |
| Example 38 | A-4 | B-8 | 21 | 50/50 | C-1 (0.3) | KBM-573 (0.1) | HP-40 (53) | AA-3/AA-04 (18/8) | A | A | A | A | A |
| Example 39 | A-4 | B-1 | 21 | 50/50 | C-1 (0.3) | — | HP-40 (68) | — | A | A | A | A | A |
| Example 40 | A-4 | B-1 | 21 | 50/50 | C-1 (0.3) | — | HP-40/SP-3 (61/7) | — | A | A | A | A | A |
| Example 41 | A-4 | B-1 | 21 | 50/50 | C-1 (0.3) | — | HP-40 (68) | — | A | A | A | A | A |
| Example 42 | A-4 | B-1 | 21 | 50/50 | C-1 (0.3) | KBM-573 (0.1) | SGPS (53) | AA-3/AA-04 (18/8) | A | A | B | A | A |
| Example 43 | A-4 | B-1 | 21 | 50/50 | C-1 (0.3) | — | SGPS/SP-3 (61/7) | — | A | A | B | A | A |
| Comparative Example 1 | A-4 | B-1 | 21 | 50/50 | None | KBM-573 (0.1) | HP-40 (53) | AA-3/AA-04 (18/8) | A | A | D | D | A |
| Comparative Example 2 | A-4 | B-1 | 21 | 50/50 | X-1 | KBM-573 (0.1) | HP-40 (53) | AA-3/AA-04 (18/8) | D | D | A | A | A |

From the results shown in Table 2, it was confirmed that in a case where the composition according to the embodiment of the present invention is used, a thermally conductive material having excellent handleability at the time of semi-curing and excellent thermally conductive properties is obtained.

In the specific compound, it was confirmed that in a case where the substituents represented by $R_1$ to $R_3$ are substituted at the ortho-position with respect to the bonding position of the phosphorus atom in the benzene ring, the handleability of the obtained semi-cured sheet is more excellent (comparison between Example 4 and Example 6 and the like).

In the specific compound, it was confirmed that in a case where the substituents represented by $R_1$ to $R_3$ are alkyl groups having no substituent or alkoxy groups having no substituent, the thermally conductive properties and the withstand voltage of the obtained thermally conductive sheet are more excellent (comparison of Examples 4 to 6 and the like).

In the specific compound, it was confirmed that in a case where all of n1 to n3 are 1, the handleability of the obtained semi-cured sheet is more excellent compared to a case where all of n1 to n3 are 0 (comparison between Example 4 and Example 9 and the like).

It was confirmed that in a case where the molecular weight of the phenolic compound is 1,000 or less, the thermally conductive properties of the obtained thermally conductive sheet is more excellent (comparison of Examples 11 to 14 and the like).

It was confirmed that in a case where the phenolic compound is a phenolic compound having a triazine ring, the thermally conductive properties, the withstand voltage, and the peel strength of the obtained thermally conductive sheet are more excellent (comparison of Examples 1 to 4 and the like).

It was confirmed that in a case where the inorganic nitride is aggregated inorganic nitride particles having an average particle diameter of 20 m or greater, the thermally conductive properties of the obtained thermally conductive sheet is more excellent (comparison between Example 4 and Example 42, and comparison between Example 40 and Example 43).

What is claimed is:

1. A composition comprising:

a phenolic compound;

an epoxy compound;

a compound represented by Formula (1); and an inorganic nitride;

(1)

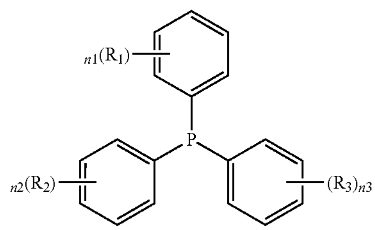

and in Formula (1), $R_1$ to $R_3$ each independently represent a substituent, n1 to n3 each independently represents an integer of 0 to 5, and the sum of n1 to n3 is an integer of 1 to 15, wherein the phenolic compound is at least one selected from the group consisting of a compound represented by General Formula (P1) and a compound represented by General Formula (P3), (P1)

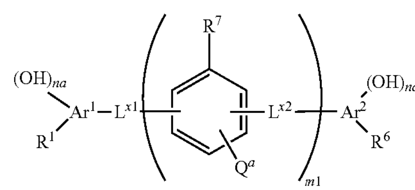

in General Formula (P1), ml represents 0 or 1, na and nc each independently represent 2 or 3, $Ar^1$ and $Ar^2$ each independently represent a benzene ring group or a naphthalene ring group, $R^1$ and $R^6$ each independently represent a hydrogen atom, a halogen atom, a carboxylic acid group, a boronic acid group, an aldehyde group, an alkyl group, an alkoxy group, or an alkoxycarbonyl group, $L^{x1}$ represents a single bond, —$C(R_2)(R_3)$— or —CO—, $L^{x2}$ represents a single bond, —$C(R_4)(R_5)$— or —CO—, $R^2$ to $R^5$ each independently represent a hydrogen atom or a substituent, $R^7$ represents a hydrogen atom or a hydroxyl group, $Q^a$ represents a hydrogen atom, an alkyl group, a phenyl group, a halogen atom, a carboxylic acid group, a boronic acid group, an aldehyde group, an alkoxy group, or an alkoxycarbonyl group, (P3)

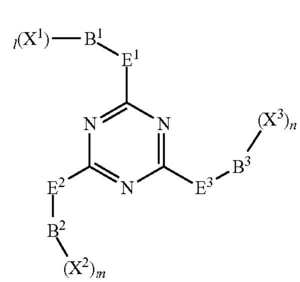

in General Formula (P3), $E^1$ to $E^3$ each independently represent a single bond, —NH—, or —NR—, R represents a substituent, $B^1$ to $B^3$ each independently represent an aromatic hydrocarbon ring group which may have a substituent, $X^1$ to $X^3$ each independently represent a hydroxyl group, l, m, and n each independently represent an integer of 0 or greater, and the sum of l, m, and n is 2 or greater.

2. The composition according to claim 1, wherein at least one of substituents represented by $R_1$ to $R_3$ is substituted at an ortho-position with respect to a bonding position of a phosphorus atom in a benzene ring in Formula (1).

3. The composition according to claim 2, wherein the substituents represented by $R_1$ to $R_3$ are alkyl groups having no substituent or alkoxy groups having no substituent.

4. The composition according to claim 2, wherein nl to n3 each independently represent 1 or 2 in Formula (1).

5. The composition according to claim 2, wherein the phenolic compound has a molecular weight of 1,000 or less.

6. The composition according to claim 2, wherein the inorganic nitride includes aggregated inorganic nitride particles having an average particle diameter of 20 μm or greater.

7. The composition according to claim 2, wherein the inorganic nitride includes boron nitride.

8. A thermally conductive material formed by curing the composition according to claim 2.

9. The composition according to claim 1, wherein the substituents represented by $R_1$ to $R_3$ are alkyl groups having no substituent or alkoxy groups having no substituent.

10. The composition according to claim 9, wherein n1 to n3 each independently represent 1 or 2 in Formula (1).

11. The composition according to claim 9, wherein the phenolic compound has a molecular weight of 1,000 or less.

12. The composition according to claim 1, wherein nl to n3 each independently represent 1 or 2 in Formula (1).

13. The composition according to claim 1, wherein the phenolic compound has a molecular weight of 1,000 or less.

14. The composition according to claim 13, wherein the phenolic compound is the compound represented by General Formula (P3).

15. The composition according to claim 1, wherein the inorganic nitride includes aggregated inorganic nitride particles having an average particle diameter of 20 μm or greater.

16. The composition according to claim 1, wherein the inorganic nitride includes boron nitride.

17. A thermally conductive material formed by curing the composition according to claim 1.

18. A thermally conductive sheet consisting of the thermally conductive material according to claim 17.

19. A device with a thermally conductive layer comprising:

a device; and a thermally conductive layer containing the thermally conductive sheet according to claim 10, disposed on the device.

* * * * *